(12) United States Patent
Harvill

(10) Patent No.: US 12,188,821 B2
(45) Date of Patent: Jan. 7, 2025

(54) SYSTEM AND METHOD FOR AUTHENTICATING AND CLASSIFYING PRODUCTS USING HYPER-SPECTRAL IMAGING

(71) Applicant: BottleVin, Inc., Santa Clara, CA (US)

(72) Inventor: Leslie Young Harvill, Olympia, WA (US)

(73) Assignee: BOTTLEVIN, INC., Santa Clara, CA (US)

( * ) Notice: Subject to any disclaimer, the term of this patent is extended or adjusted under 35 U.S.C. 154(b) by 139 days.

(21) Appl. No.: 18/121,060

(22) Filed: Mar. 14, 2023

(65) Prior Publication Data
US 2024/0310212 A1    Sep. 19, 2024

(51) Int. Cl.
| | |
|---|---|
| *G01J 3/28* | (2006.01) |
| *G01J 3/02* | (2006.01) |
| *G01N 21/31* | (2006.01) |
| *G02B 5/20* | (2006.01) |
| *G02B 5/32* | (2006.01) |
| *G06V 10/143* | (2022.01) |
| *G06V 10/60* | (2022.01) |
| *G06V 10/764* | (2022.01) |

(52) U.S. Cl.
CPC .......... *G01J 3/2823* (2013.01); *G01J 3/0229* (2013.01); *G01N 21/31* (2013.01); *G02B 5/20* (2013.01);
(Continued)

(58) Field of Classification Search
CPC ...... G06V 10/14; G06V 10/143; G06V 10/60; G06V 10/764; G02B 5/20; G02B 5/32;
(Continued)

(56) References Cited

U.S. PATENT DOCUMENTS

| | | | | |
|---|---|---|---|---|
| 5,748,308 A | * | 5/1998 | Lindberg | G01J 3/02 356/243.1 |
| 6,313,908 B1 | * | 11/2001 | McGill | G02B 5/32 356/28.5 |

(Continued)

OTHER PUBLICATIONS

Casale, M., et al., 'NIR and UV-vis spectroscopy, artificial nose and tongue: Comparison of four fingerprinting techniques for the characterisation of Italian red wines', ACA, v668, iss. 2, 143-148, (https://doi:10.1016/j.aca.2010.04.021) Jun. 4, 2010, 6pgs.

(Continued)

Primary Examiner — Gordon J Stock, Jr.
(74) Attorney, Agent, or Firm — Patterson & Sheridan, LLP.; Malgorzata A. Kulczycka

(57) ABSTRACT

In some implementations, a method for authenticating and classifying a set of materials comprises: transmitting a visible range light from a light source toward a vessel containing a material sample; wherein the visible range light passes through the vessel containing the material sample, passes through the material sample, and bounces off a HOE located at a bottom of the vessel toward a camera implemented in a smartphone; receiving, by the camera of the smartphone, the visible range light that bounced off the HOE; based on a mapping of each of the visible range light onto an area of an image sensor, generating a holographic optical element that has a plurality of regions, that receives input light reflected or transmitted through a new material, and that filters the input light to a filtered light by each characteristic light spectra, and mapping the filtered light onto the image sensor's area.

20 Claims, 21 Drawing Sheets

(52) U.S. Cl.
CPC ............. *G02B 5/32* (2013.01); *G06V 10/143* (2022.01); *G06V 10/60* (2022.01); *G06V 10/764* (2022.01); *G01J 2003/2833* (2013.01); *G01J 2003/2836* (2013.01)

(58) Field of Classification Search
CPC ...... G01J 3/0205; G01J 3/0229; G01J 3/0254; G01J 3/0256; G01J 3/0272; G01J 3/12; G01J 3/28; G01J 3/2803; G01J 3/2823; G01J 3/2846; G01J 3/42; G01J 3/46; G01J 3/463; G01J 3/51; G01J 2003/1213; G01J 2003/1217; G01J 2003/1226; G01J 2003/123; G01J 2003/1234; G01J 2003/1278; G01J 2003/1282; G01J 2003/2826; G01J 2003/283; G01J 2003/2833; G01J 2003/2836; G01J 2003/284; G01J 2003/2866; G01J 2003/2873; G01J 2003/466; G01N 2021/1765; G01N 2021/1776; G01N 2021/317; G01N 2021/3177; G01N 2021/3196; G01N 21/25; G01N 21/251; G01N 21/255; G01N 21/29; G01N 21/31
See application file for complete search history.

(56) References Cited

U.S. PATENT DOCUMENTS

| | | | | |
|---|---|---|---|---|
| 6,507,419 B1 * | 1/2003 | Popovich | ............ | G02F 1/13342 359/24 |
| 6,940,653 B2 * | 9/2005 | Favalora | ............ | H04N 13/302 359/24 |
| 7,239,594 B2 * | 7/2007 | Edwards | ............ | G11B 7/0065 369/112.28 |
| 7,330,267 B1 * | 2/2008 | Weitzel | ............ | G01J 3/453 356/456 |
| 7,554,572 B2 * | 6/2009 | Takahashi | ............ | G01J 3/0264 348/335 |
| 7,675,662 B2 * | 3/2010 | Erickson | ............ | G03H 1/2249 359/2 |
| 8,553,143 B2 * | 10/2013 | Leibler | ............ | G02B 5/32 348/40 |
| 10,677,976 B2 * | 6/2020 | Mukhtarov | ............ | G03H 1/30 |
| 10,859,436 B2 * | 12/2020 | Allen | ............ | G01J 3/2823 |
| 11,927,785 B2 * | 3/2024 | Lim | ............ | G02B 27/4205 |
| 11,994,518 B2 * | 5/2024 | Swager | ............ | G01N 21/251 |
| 12,035,040 B2 * | 7/2024 | Motosugi | ............ | G06T 7/11 |
| 2017/0031144 A1 * | 2/2017 | Rostykus | ............ | G03H 1/0465 |
| 2024/0219287 A1 * | 7/2024 | Hong | ............ | G06V 10/774 |
| 2024/0310278 A1 * | 9/2024 | Harvill | ............ | G01N 21/33 |
| 2024/0310781 A1 * | 9/2024 | Harvill | ............ | G01N 21/359 |

OTHER PUBLICATIONS

Bruder, Fredrich-Karl, et al., 'The Chemistry and Physics of Bayfol HX Film Holographic Photopolymer', Polymers 2017, MDPI, vol. 9, iss. 10, 472, (https://doi.org/10.3390/polym9100472), publ. Sep. 26, 2017, 35pgs.

Acevedo, F. Javier, et al., 'Classification of Wines Produced in Specific Regions by UV-Visible Spectroscopy Combined with Support Vector Machines', Journ. of Agricl and Food Chem, vol. 55, No. 17. pp. 6842-6849, 2007 ACS, publ. Jul. 28, 2007, 9pgs.

* cited by examiner

| 440A Wine Type | 442A Wavelengths (in nm) for which Absorption is significant |
|---|---|
| 440B White Wine | 240, 260, 280, 310, 340, 360, 390 |
| 440C Red Wine | 290, 330, 360, 490, 540, 610, 650, 760, 800 |

SYSTEM AND METHOD FOR AUTHENTICATING AND CLASSIFYING PRODUCTS USING HYPER-SPECTRAL IMAGING

FIELD OF DISCLOSURE

One technical field of the present disclosure is authentication of the molecular composition of a product or material using a unique combination of holography and spectrometry. Another technical field is the use of transmitted, or reflected, light spectra received from a material and the use of the spectra to classify the corresponding material. Another field is the use of a holographic printer to fabricate optical elements that filter or reflect specific wavelengths of light.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Advancements in the materials available for the fabrication of holographic optical elements have been impressive over the last few decades. This is particularly important because the availability of photopolymer-based recording materials for the fabrication of efficient, high quality holographic optical element masters, and inexpensive reproduction of these holographic optical element masters will affect the design and cost of many future optical systems. (See, for example, *The Chemistry and Physics of Bayfol® HX Film*, Friedrich-Karl Bruder, Thomas Fäcke and Thomas Rolle, Polymers 2017, 9, 472; doi: 10.3390/polym9100472).

Furthermore, the advancements in the manufacture and distribution of imaging sensors for mobile devices, their increased sensitivity, and their decreasing cost-per-pixel will also affect the designs and wide-spread availability of imaging systems.

Moreover, the availability of low-cost support for machine learning models processed locally in the hardware of mobile devices will also affect the quality and availability of software to classify the light spectra obtained from a material's reflectance, transmission, or excited reflectance.

However, the systems currently available for the classification of a material at the molecular level are expensive and require a high level of expertise to operate. For example, some devices used to classify materials, such as ultraviolet (UV) spectrometers, near infrared (NIR) fluorescence spectrometers, Raman Scattering spectrometers, and Nuclear Magnetic Resonance (NMR) devices, are quite expensive and difficult to operate. Indeed, the selections and operations of these devices for a specific compound usually rely on the expert knowledge of both the devices and the molecular structure of the compound. Providing such services is usually expensive and limited to how and where the products may be authenticated and classified.

Known systems for spectroscopy typically scan a continuous region of spectra and use their imaging sensors for the entire continuous spectrum. The resolution provided by those systems is limited by the mapping of a continuous spectral region to the area of the image sensor. (See, for example, *Classification of Wines Produced in Specific Regions by UV-Visible Spectroscopy Combined with Support Vector Machines*, by F. JAVIER ACEVEDO, American Chemical Society, 2007) (Also, *Raman and Surface-Enhanced Raman Spectroscopy*, by Pavan M. Vl Raja et al, LibreTexts Chemistry, 2022.)

However, those systems are usually unable to optimally use the area of the image sensors and are unable to classify a specific set of materials or map each spectra to an area of the image sensor.

BRIEF DESCRIPTION OF THE DRAWINGS

In the drawings:

FIG. 4C is an example of some relevant wavelengths after a future selection.
FIG. 4D is an example depiction of spectral line placement for wine authentication.

DESCRIPTION OF EXAMPLE EMBODIMENTS

Figure 1A:
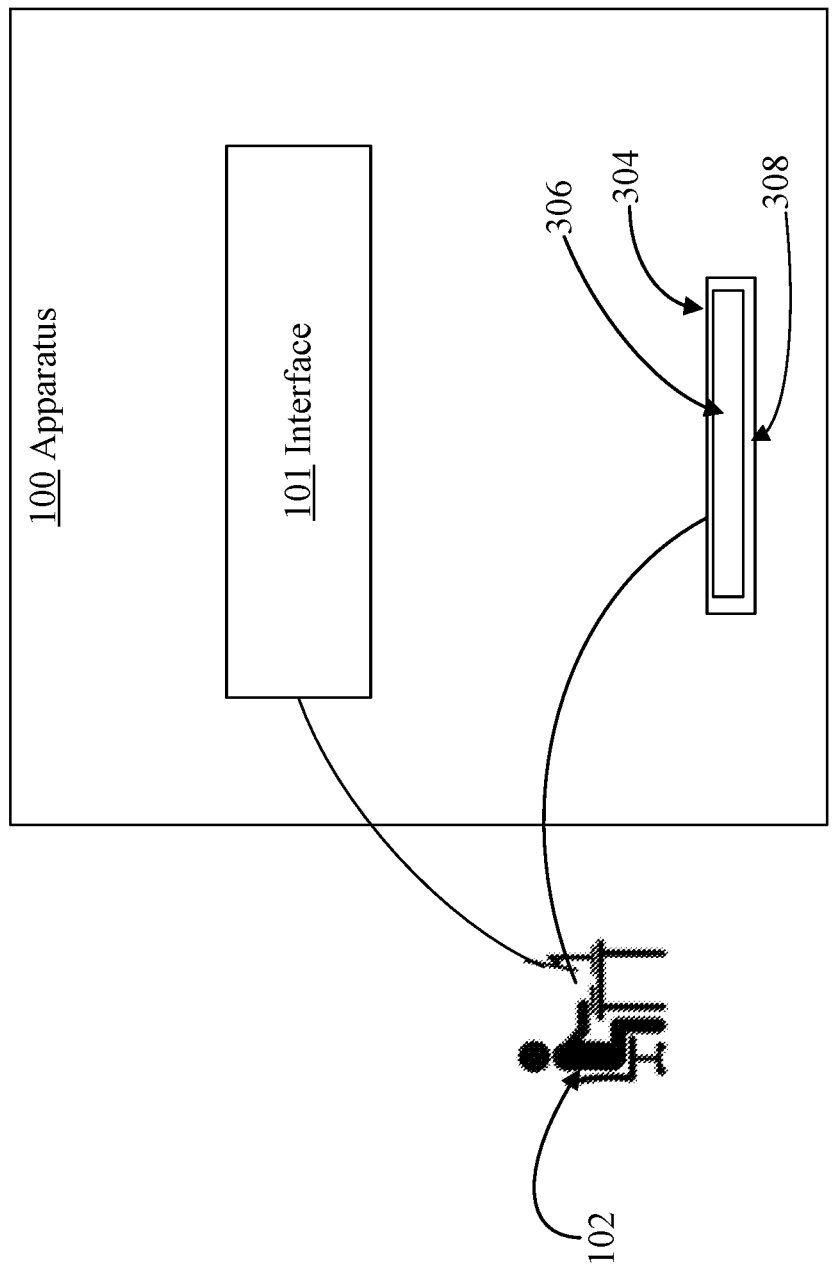
FIG. 1A is an example application of a present approach.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:
1.0. GENERAL OVERVIEW
   1.1. IDENTIFYING A SET OF MATERIALS FOR CLASSIFICATION
   1.2. DETERMINING A TRAINING SET OF MATERIALS
   1.3. RECORDING FULL SPECTRA FOR MATERIALS 1.4. CLASSIFYING A SET OF MATERIALS
1.5. DETERMINING CHARACTERISTIC LINE SPECTRA NEEDED FOR CLASSIFICATION OF EACH MEMBER IN A SET OF MATERIALS
   1.5.1. FEATURE SELECTION
   1.5.2. MACHINE LEARNING APPROACH
   1.5.3. EXAMPLE 3D MODEL
1.6. BUILDING A SOFTWARE-BASED CLASSIFIER BASED ON AN CHARACTERISTIC LINE SPECTRA
1.7. DETERMINING AN IMAGING SENSOR TYPE
1.8. DETERMINING AN GEOMETRY OF A HYPER-SPECTRAL CLASSIFIER
1.9. DETERMINING A MAPPING OF A CHARACTERISTIC LINE SPECTRA TO AN AREA OF AN IMAGING SENSOR
1.10. TRANSFORMING A MAPPING OF LINE SPECTRA ON AN AREA OF AN IMAGING SENSOR TO AN ARRAY OF HOLOGRAPHIC PIXELS ON A HOLOGRAPHIC OPTICAL ELEMENT TO BE FABRICATED
   1.10.1. DIFFRACTION
   1.10.2. BRAGG'S LAW
1.11. CALCULATING RECORDING WAVELENGTHS AND RECORDING GEOMETRIES FOR HOLOGRAPHIC PIXELS
1.12. CONSTRUCTING THE HOLOGRAPHIC PRINTER
   1.12.1. HOLOGRAPHY
   1.12.2. RECORDING A HOLOGRAM
   1.12.3. RECONSTRUCTING A HOLOGRAM IMAGE
   1.12.4. THE EFFECT OF BRAGG'S LAW
1.13. CONSTRUCTING A HOLOGRAPHIC PRINTER
1.14. RECONSTRUCTION
1.15. GENERATING INSTRUCTIONS FOR A HOLOGRAPHIC PRINTER
   1.15.1. PLACING A CAMERA
   1.15.2. LIGHT PATH
   1.15.3. CCD
   1.15.4. ADDENDUM A
1.16. PRINTING A MASTER HOLOGRAPHIC OPTICAL ELEMENT
1.17. TESTING
1.18. USING A MASTER HOLOGRAPHIC OPTICAL ELEMENT TO FABRICATE PRODUCTION UNITS
   1.18.1. COPYING A MASTER HOLOGRAM
   1.18.2. VARIATIONS
1.19. EXAMPLE APPLICATIONS
1.20. EXAMPLE WINE CLASSIFICATION
   1.20.1. RELATION BETWEEN LIGHT WAVELENGTHS AND ABSORPTION
   1.20.2. RELATION BETWEEN LIGHT WAVELENGTHS AND WINES
   1.20.3. EXAMPLE PLACEMENT OF SPECTRAL LINES FOR AUTHENTICATING WINES
   1.20.4. EXAMPLE COMPUTER CONFIGURATION FOR ANALYZING SPECTRAL LINES PLACEMENTS
2.0. EXAMPLE APPROACH
   2.1. CLASSIFICATION OF RED AND WHITE WINES-ADDENDUM B
   2.2. EXAMPLES OF TRAINING SETS
   2.3. EXAMPLES OF UV-NIR SPECTRA
   2.4. CLASSIFICATION OF SPECTRA
   2.5. CHARACTERISTIC LINE SPECTRA OF RED AND WHITE WINES
   2.6. SOFTWARE-BASED CLASSIFIER FOR WINE SPECTRA
   2.7. SPECTRAL RESPONSE OF CMOS BACK-ILLUMINATED CCD
   2.8. GEOMETRY FOR TRANSMISSION READING OF RED AND WHITE WINE
   2.9. MAPPING OF THE CHARACTERISTIC LINE SPECTRA TO CMOS BACK-ILLUMINATED CCD
   2.10. LAYOUT OF THE HOLOGRAPHIC OPTICAL ELEMENT (HOE)
   2.11. RECORDING WAVELENGTH AND ITS EFFECT ON ILLUMINATION SOURCES
   2.12. GEOMETRY FOR A HOLOGRAPHIC PRINTER FOR FABRICATING A CUSTOM HOE FOR DETECTING THE CHARACTERISTIC LINE SPECTRA OF RED AND WHITE WINE
   2.13. GENERATION OF INSTRUCTIONS FOR PRINTING A HOE
   2.14. PRINTING
   2.15. INTEGRATION
   2.16. TEST
   2.17. FABRICATION OF PRODUCTION HOES
   2.18. PRACTICAL APPLICATIONS
   2.19. EXAMPLE FLOW CHART
3.0. EXAMPLE SMARTPHONE-BASED IMPLEMENTATION
   3.1. SMARTPHONE-BASED CLASSIFIERS
   3.2. HOLOGRAPHIC OPTICAL ELEMENTS FOR SMARTPHONES
   3.3. CONNECTION OF AN ADDITIONAL LIGHT SOURCE
   3.4. REFLECTIONS FROM A PHONE CASSETTE
   3.5. EXAMPLE FLOW CHART
4.0. EXAMPLE APPROACH FOR A MICRO HYPERSPECTRAL IMAGING
   4.1. CLASSIFIERS FOR MICRO HYPERSPECTRAL IMAGING
   4.2. BRAGG ELEMENTS FOR MICRO HYPERSPECTRAL IMAGING
   4.3. MICRO HYPERSPECTRAL IMAGING APPLICATIONS
5.0. EXAMPLE APPROACH BASED ON HYPERSPECTRAL IMAGING
   5.1. IMPLEMENTATION OVER VIEW
   5.2. EXAMPLE OF RAMAN SCATTERING HYPERSPECTRAL IMAGING
   5.3. EXAMPLE FLOW CHART
6.0. IMPLEMENTATION MECHANISMS
7.0. ADDENDUM A
8.0. ADDENDUM B
9.0. ADDENDUM C 1.0. General Overview The methods and systems presented herein are used to enhance and improve the process of reading the light spectra that are either transmitted by, or reflected from an object using means other than a prism or a diffraction grating used to diffract the light.

The methods disclosed herein rely on fundamental changes in an optical element fabrication, sensing, and classification to assemble a system for the authentication and classification of molecular compositions of products or materials.

The presented methods have a broad applicability in many industries to perform the authentication and classification of products. For example, the methods may be broadly used in fraud detection to detect, for instance, the products that have been counterfeited. The presented approach may prevent consumers from purchasing products that have been forged, or contaminated, improperly stored, or otherwise modified in some improper manner.

Usually, the product consumers trust the sellers and believe that the product manufacturing processes have been well managed, and that the products have been stored properly and protected from contamination or improper distribution. That trust, however, may be insufficient to guarantee that the products are indeed authentic.

The presented method provides an approach for determining authenticity of the products and determining that the product is commensurate with the actual value of the product. The approach is relatively easy to implement and to use by consumers.

Among other things, the approach relies on several fundamental changes made to the fabrication of the optical elements, as well as to changes in the way the elements operate and perform the classification. The new optical elements have been implemented in the process of assembling a novel system for the authentication and classification of the molecular composition of a product or a material.

In some implementations, the presented approach allows reading selected wavelengths of the light spectra rather than a continuous spectrum as in other approaches. Furthermore, instead of using a prism or grating, the presented approach uses optical custom optical elements that are configured to focus on small regions of the light spectra and that are tuned to reflect only certain wavelengths of light.

The disclosed systems and methods are used to optimize the use of an image sensor and implements a new holographic optical element that filters light reflected or transmitted from the material for a specific set of line spectra needed to classify sets of materials, and then maps each spectra to an area of the image sensor.

1.1. Identifying a Set of Materials for Classification

The approach presented herein facilitates the enhancement and improvements of the process of reading the light that an object either transmits or reflects. The analysis of the spectral light lines is important for a variety of reasons, including the characterization of objects' composition, objects' color, objects' surfaces, or the like. For example, the analysis may include the characterization of a piece of fine leather or characterization of a bottle of wine.

The analysis of the spectral lines may be used to, for example, identify and/or verify the authenticity of materials. This may include verifying the authenticity of, for example, the leather used in a Gucci™ bag or authenticity of wine in a vintage wine bottle. Furthermore, the analysis of the spectral lines may be used to distinguish red wine from white wine, or a wine from one region from another, as described later.

The spectra lines may be used to, for example, verify the distinct characteristics of wine. The characteristics may be determined based on the distinct and separate spectra that can be separated across the light spectra. For instance, red wine may be characterized by the information included in the UV light spectrum, the Near IR spectrum, as well as in the blue and green spectra.

1.2. Determining a Training Set of Materials

Material, in this context, may be used to describe a substance, compound, or product within a set that the system must classify or authenticate. The analysis of the spectral lines transmitted through, or reflected from, for example, wine may include determining the wine characteristics that indicate the presence or absence of and the amount of, for instance, water, tannic acid, fructose, gallic acid or ethanol, and other wine components that absorb specific spectra of light. The set of training materials for red and white wines may then include a set of reagent chemicals in concentrations in water similar to that found in red and white wines. The training set may also include specific varieties of red and white wines for classification These may include Cabernet Sauvignon, Pinot Noir, Barolo, Rose, Chardonnay, Pinot Blanc and the like. The training set may further include varietals of such wines from specific regions, such as a Cabernet Sauvignon from Napa Valley in California and a Cabernet Sauvignon from Australia. The training set may further include specific wines for authentication, such as a Screaming Eagle Cabernet Sauvignon from Napa Valley in California.

1.3. Recording Full Spectra of Each Example Material

In some implementations, the Near UV, Visible, and Near IR spectra for each item in the training set may be collected. For instance, these spectra may be collected using a Thor Labs CCS200 Extended range spectrometer, a Xenon flash lamp source, such as the Excelitas UPAX-3. The Xenon flash may illuminate a sample of wine held by a cuvette, the light may be transmitted through the sample, and the extended spectrum may be read by the CCS200. A collection of these spectra may be organized and assembled into a training set for classification.

1.4. Classifying a Set of Materials

The training set collected above may be filtered for training in several steps.

First, the spectrum of the light source and the solute may be normalized or removed from the samples. For instance, for each data collection session for a specific item in the training set, a series of spectra of distilled water may be obtained. These spectra may be used to normalize the recorded spectra of the samples for that session. In one embodiment, a statistical median distilled water reference spectra is chosen as a reference by finding the median of the area under the spectral curve for each of the distilled water series. Next, a candidate spectrum of the series of spectra taken of an item in the training set may be chosen by finding that one which is most similar to the reference water spectra. Finally normalizing the spectrum of the item in the training set may be performed by scaling that spectrum's amplitude by the reciprocal amplitude of the reference distilled water spectra.

Secondly, the normalized spectrum for each item in the training set may be filtered for noise. In one implementation this may be performed by applying a Pseudo Gaussian IIR filter to the amplitude of the normalized spectrum. The window or size of the Gaussian filter may be determined by the resolution of the device. In this case the CCS200 has a resolution of about 2 nm and records a spectral line about every 0.5 nm, so the Gaussian window may be set to 4.

Finally, each spectrum may be compressed by the presence of high frequency features. That is, areas with smaller change in amplitude may be sampled sparsely, while areas with large changes in amplitude may be preserved.

In one embodiment, the filtered spectrum data for each item in the training set may be used to build a tensor flow model for matching an unknown spectrum to a specific varietal of wine.

In another embodiment, the filtered spectrum data for each item in the training set may be used to build a Partial Least Squares model to determine how close an unknown spectrum is to a specific product release.

In another embodiment, an additional training set is used which lists.

1.5. Determining Characteristic Line Spectra Needed for Classification of Each Member in a Set of Materials Specifying the proper holographic optical elements that have all the color dots that reflect properly the required spectra is very important. Suppose that wine is poured into a container. The wine sample may be tested using the present approach in which a relatively inexpensive sensor such as the Sony IMX477-AACK. The silicon-based sensor may detect light spectra from ~200 nm to 1024 nm. Such a mass market sensor may be a complementary metal oxide semiconductor (CMOS) charge coupled device (CCD) sensor. The sensor may be configured to record a wide light range, including the range from the near UV into the NIR. The sensor may be coupled with a light source or a set of light sources that illuminate over the range, such as a Xenon Flash lamp. The sensor and associated firmware may also be configured to read the reflection characteristics of the holographic optical element (HOE). The CMOS CCD image sensors may implement different technologies for capturing the images digitally, as described later.

The geometry used in the present embodiment of a user instrument to authenticate materials is rather simple, and its cost is relatively low. Therefore, while other approaches may use quite expensive sensors (such the sensors priced at 10 times the cost for slightly better response in the NIR), the presented approach uses inexpensive sensors such as those found in cameras and cell phones or similar commercial devices. The light sources implemented in the present approach are also relatively inexpensive. Copying a hologram from a master hologram is also relatively inexpensive. Therefore, the components of the disclosed user device are inexpensive, the device itself is simple, and simple to manufacture.

A master holographic optical element may be fabricated using a holographic printer that is constructed to record a series of holographic pixels (reflective dots) that reflect a narrow frequency of light from an input light source to a specific location on the CCD sensor.

Once a master hologram is created, the master hologram is used to produce copies of the hologram. The copies can be mass-produced based on the master hologram, and manufacturing the production copies may be inexpensive and affordable.

The production copies may be made available on the market and utilized for a multitude of applications, including the applications for providing wine-verification services for wine collectors and connoisseurs. Since production of the hologram copies is rather inexpensive, the wine-verification services may be offered efficiently and affordably.

The production copies may be used to verify (when illuminated and read in a simple apparatus), for example, the vintage of the wine, verify the authenticity of the wine, verify the quality of the wine, and the like. The verification may be performed by comparing the reading from a production copy of a hologram used to test the wine sample with the expected characteristics of the claimed wine. If a match is found, then it may be concluded that the wine sample indeed is what the claimed wine. However, if the match is not found, then it may be concluded that the wine sample is not what it was believed to be.

FIG. 1A is an example application of a present approach. In the depicted example, a user 102 uses an interface 101 of an apparatus 100 to test a wine sample stored in a compartment 103 to determine, for example, authenticity of the wine stored in compartment 103. As it is described later, compartment 103 may include a production copy of a hologram located at one side of the compartment while the compartment is illuminated and sensed from the opposite side. The production copy may be used to, for example, determine the authenticity of the wine sample.

The production copies may be also used to help the wine collectors/connoisseurs to determine the collectors' wine preferences, tastes, and notes. The preferences and the like may be used to search for the wines that include the preferred characteristics. For example, if a user likes to taste some cherry-tones in wine, then he may search for the wines that have the cherry-tone characteristics. The search may be performed by browsing, for example, a collection of the wines available from a main or central repository.

This approach is especially applicable to a high-end clientele. The clients who collect, test, buy and sell rather expensive wines want to be confident that what they buy is indeed the authentic wine, not a facsimile. The wine collectors and wine aficionados want to make sure that the highly-priced wines are indeed what is claimed they are.

1.5.1. Feature Selection

There are at least two reasons for selecting the most relevant wavelengths. One is to facilitate the classification by removing those wavelengths that contain low signal and high noise. Another reason is to verify that the wavelength resolution is sufficient enough to discriminate between, for example, different types of wines since resolution is limited by the sensing area of the CCD. Once this selection of the wavelengths is made, further variable resolutions are tested in an effort to obtain better classification accuracy. Usually, the classifier method is selected first. Then, the additional features are taken into consideration.

1.5.2. Machine Learning Approach

In some implementations, the approach presented herein uses a machine learning methodology. The machine learning system can be trained based on, for example, high quality spectral data. Such data may be either private data or commercially available data. Such data may be gathered from specific materials or products the system is designed to authenticate. Such data may be filtered based on areas of difference in the samples. Many iterations of filtering data and building and training a classifier using an ML system may be needed. This process of iteration may be automated and evaluated using a set of constraints, human interaction, and/or an adversarial ML system. Once the machine learning system is trained, the system may be used to classify wine samples. An ML system may be trained to authenticate specific products. An ML system may be trained to associate a spectral fingerprint with a type of wine and its appellation or location. Additionally, an ML system may be trained to associate a spectral fingerprint with qualitative data, such as structured tasting notes. Such a system may be used to recognize the tasting notes from wine samples of other wines. For instance, Pinot Noir wines usually have a balanced amount of acid, which may give the wines somewhat bright taste. Pinot Noir wines may also have a kind of mushroom-like tones, or strawberry or raspberry tones. All of those notes could be correlated by a machine learning system to a spectral fingerprint. Then, other wines with unknown signatures can be tested to determine whether they are, for example, the Pinot Noir wines with similar notes.

The trained machine learning system may be used to determine the wines that have the specific taste-notes, or signature.

1.5.3. Example 3D Model

Figure 1B:
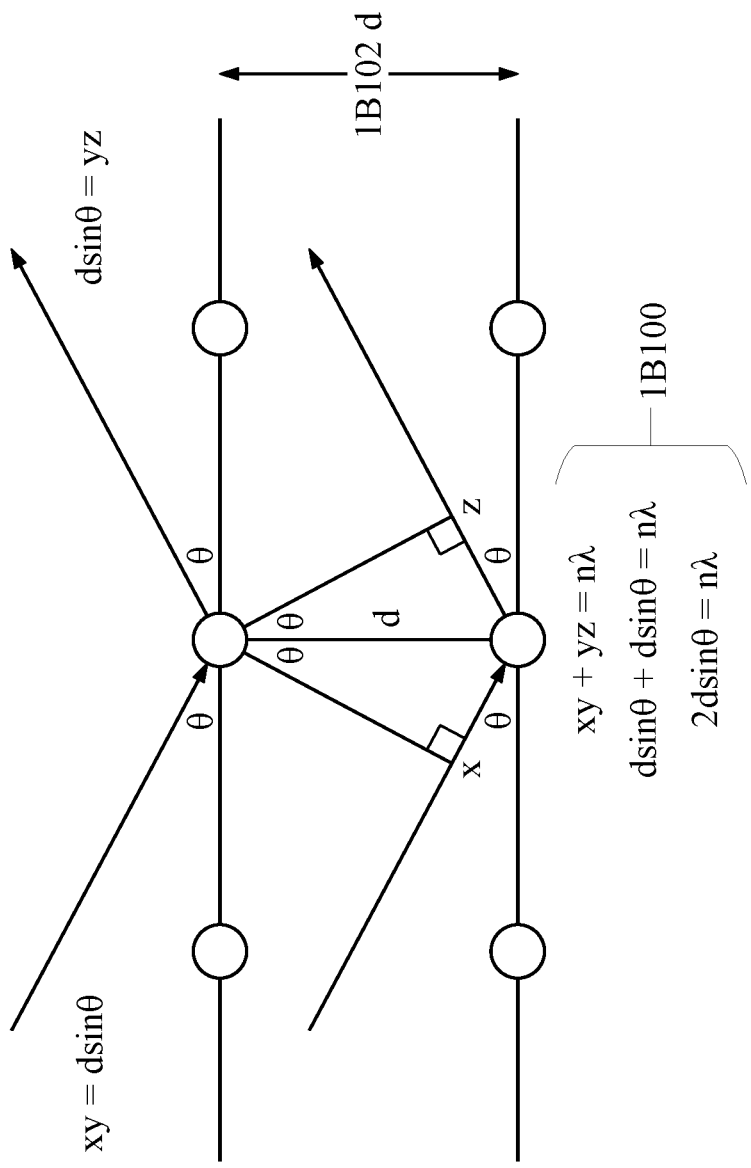
FIG. 1B is an example of the Bragg approach.
Figure 1C:
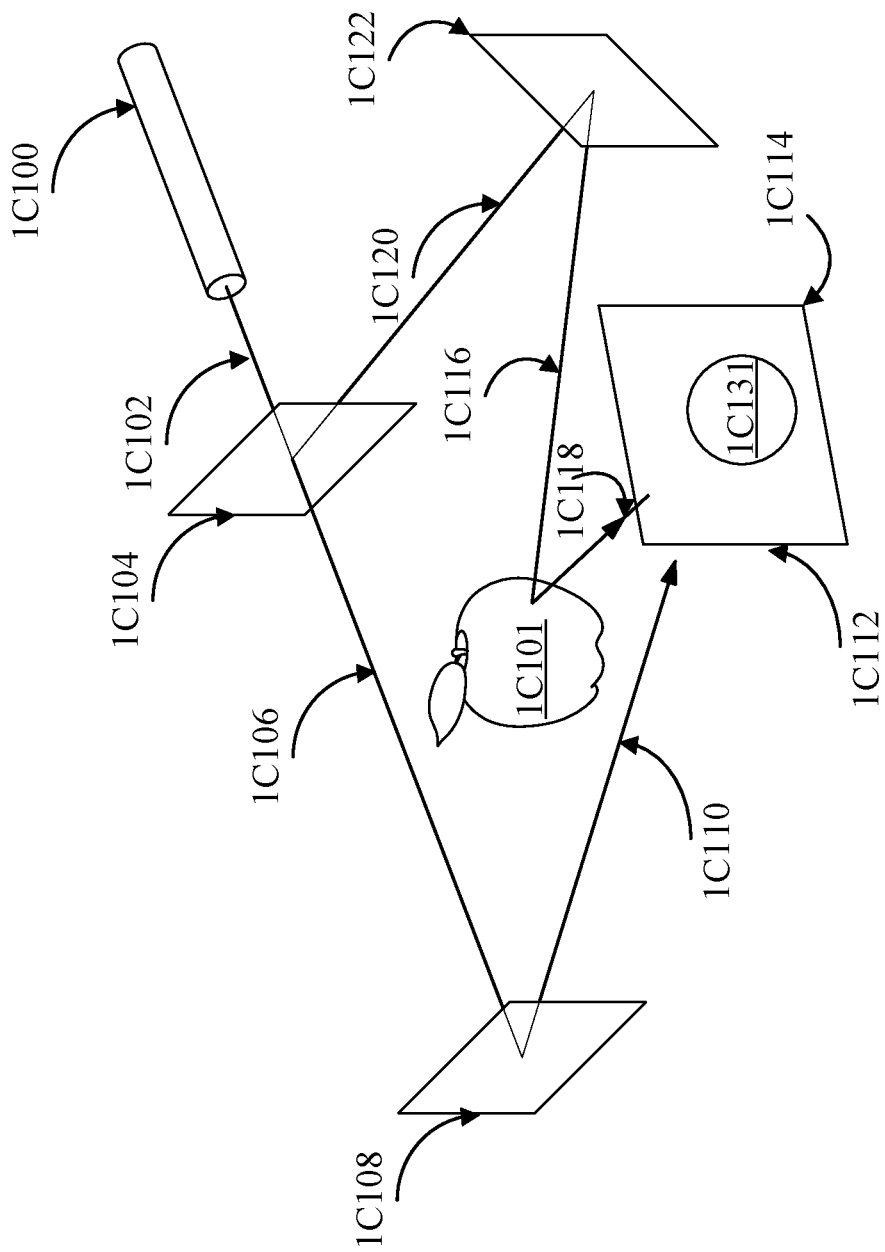
FIG. 1C is an example of an apparatus implementing a holographic technique.
Figure 1D:
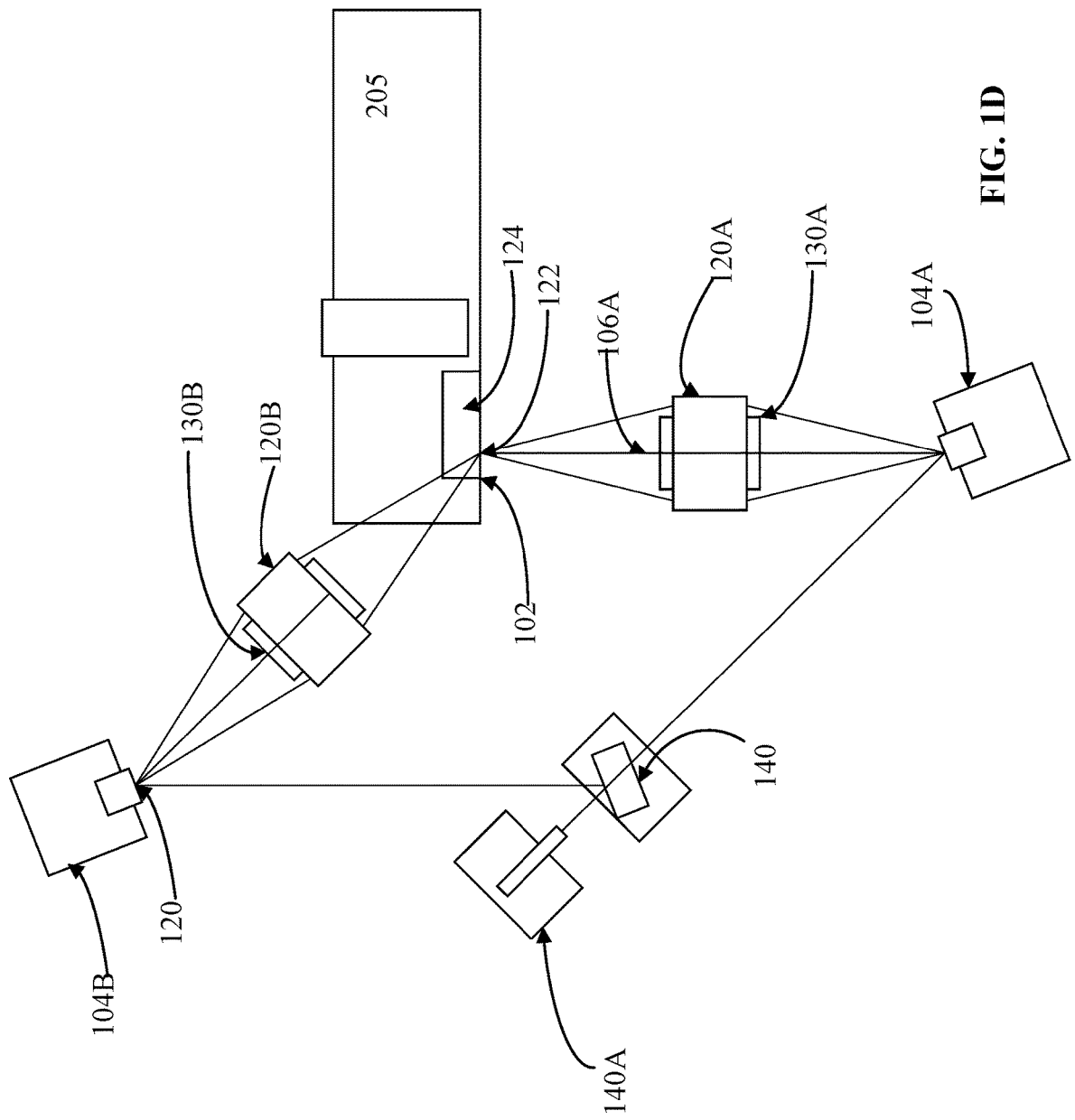
FIG. 1D is an example 3D model of an example setup according to one embodiment.
Figure 2:
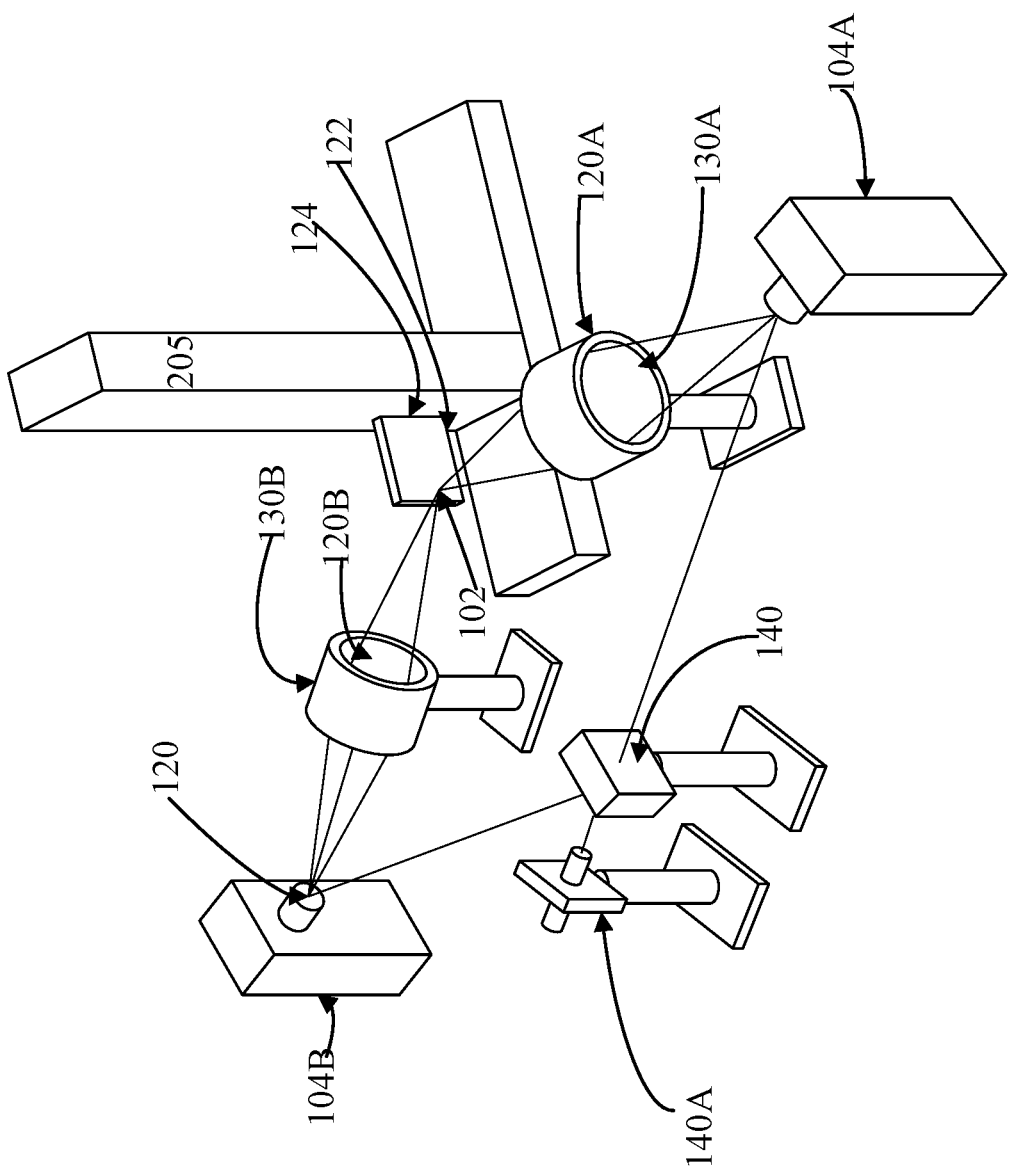
FIG. 2 is an example 3D model of an example setup according to one embodiment.

FIG. 1D and FIG. 2 depict an example 3D model of an example setup. More specifically, FIG. 1D is a top view and FIG. 2 is a perspective view of the holographic printer that may be used to print an array of dots (as described later). An array 400 of a spectra 402 may be printed by a general purpose holographic printer. The laser beam is split, and then falls on mirrors 130A and 130B. There are two beam steering devices 104A and 104B, in which each incoming beam falls upon a mirror at point 120, each mirror may be rotated slightly, relative to the point the beam strikes the mirror. Rotation is performed about the x and y of this point. An automated means is used to move the mirrors in this matter.

A beam that comes from 104B is called a reference beam, while a beam that comes from 104A is called an object beam.

The directed beam leaves the steering devices 104A and 104B and falls upon focusing lens pairs 120A and 120B the first lens of each pair collimate the beam. The second lens of each pair focuses the beam on a plate of holographic film 124, at a single point 102. At point 102, during a given exposure duration, holographic fringes are encoded in the photopolymer of the holographic film.

The fringe orientation relative to the normal of the holographic plate, and the fringe spacing during construction may be calculated by calling the construct( ) function in Addendum A using the wavelength of the spectral line to encode for that point, and the playback angles for the light and CCD used in the target consumer apparatus.

The incident angles for the reference and object beams, determined by mirror angles 104A and 104B, may be calculated by calling reconstruct( ) with the wavelength of the laser light used in the printer, and using the fringe properties set by the construct( ) call.

The XY motion stage 205 moves the holographic film so that the next dot in the array may be encoded. The XY motion stage is an automatic means to move the holographic film in two dimensions.

The Array of points 102 is encoded on a film plane 124. The array of points is encoded one at a time because hologram construction in the film is most easily done with a single laser, and a single wavelength. Thus, the angle of the beam needs to be changed to produce the required fringe spacing using a fixed wavelength of laser light. The angle of interference is being changed between the two beams, and that causes a change in the fringe separation.

The construct( ) and reconstruct( ) formulas may be used to determine the light color that needs to be reflected. The formula may specify the micro fringes in a polymer of the film for reflecting the selected wavelengths. The formula may be encoded in code and used to determine one construction wavelength and then another reconstruction wavelength, and the like. The formula may be used to construct positioning commands sent to the x/y stage, beam steering stages, and to turn the laser source on and off for exposure of a single dot or holographic pixel.

Generally, it may be quite time and resource consuming to create a master hologram; however, once the master hologram is made, the master hologram may be inexpensively reproduced to create production copies, which then may be commercialized, provided to wine establishments, provided to wine aficionados and connoisseurs, and the like. A production copy may be essentially a high quality spectral filter that has been encoded in a set of little pixels that each reflect only one wavelength at the time when placed in the playback geometry. The playback geometry specifies the angle and distance of an illuminating light source (that covers the spectra to be analyzed), the position of the sample compound to be analyzed, the position of the production copy, and the position of the CCD, camera, or optical sensor.

As shown in FIG. 1D and FIG. 2, a laser beam goes through a beam splitter. Part of the beam is reflected from a mirror 140 and is reflected up to an element 104B and the other half is reflected and is transmitted down to 104A and 120A, which are two axis goniometers. They pivot around the point at which the laser beam is touching a cylinder of 120A. The cylinder is a first-surface mirror.

A beam that comes from 104B is called a reference beam, while a beam that comes from 104A is called an object beam.

The present approach is a way of making a reflection hologram that will reflect a specific color. Ordinarily, it would reflect just the color of the light emitted from the laser, but by encoding the way the light is transmitted/reflected specifically at certain angles, the present approach allows printing any color within a certain range.

A set up of individual pixels on film plane 124 is such that the pixels can be later played back so that they reflect a specific spectral line.

A lens takes a focal point from a goniometer and then refocuses it on film plane 124. There is, however, an angular limit to the amount that the laser beam can still remain as a thin beam. But as it is moved across the surface, it is focused on an entry point on one side of the film plane and then on the other side to film plane at 124, causing a change in the angle. This is sometimes called a flying spot.

The presented approach uses two lenses for each focusing assembly 120A and 120A. The lenses form a paired set of plane convex lenses that have the same focal length. The first lens will take the point at 104A, which is its focal point, and then it turns that into a collimated or parallel beam and transfers it to a paired lens on the other side of 120A. That will then focus it to a point at 122.

The holographic printer apparatus is used to make a master hologram. The master hologram is copied to make production holograms. Production holograms are placed in a 'playback geometry' to analyze the specific spectral absorption or emission of a substance. The intent of the spectral analysis is to make an optical element that will then be available in a simple form and used for scanning content stored in a compartment near the film plane. An example of the content may be wine, and the scanning may be performed to measure the authenticity of the wine.

Once a master hologram is created, it is used to make production copies. Creating a production copy may include placing the master hologram up against an exposed sheet of the same film and then using a bulk copy process described later.

Creating a master hologram may be time consuming, expensive, and require high tolerances to be encoded in a specific way. However, copying the master into a production copy may be relatively simple because the bulk copies can be simple contact prints, and thus inexpensive.

Once a set of training materials for classification of materials (e.g., wines and the like) is identified, a subset of specific materials (e.g., specific wines) is determined. The specific materials need to be different enough from each other so that they can be distinctive and that they can be classified, but similar enough to each other so that they all fall into the respective categories. For example, since red wines have certain characteristics and those characteristics may be encoded using different light spectra, the encoded characteristics may be used to distinguish the red wines from, for example, white wines.

The characteristic line spectra may be determined for classification of each member of the set of material. That information is essential for building a filter for a machine learning model to determine what inputs it needs in terms of spectral lines to classify the wine.

1.6. Building a Software-Based Classifier Based on a Characteristic Line Spectra Approaches presented herein include developing software applications for generating a classifier for a machine learning system based on the characteristics of the line spectrum. The machine learning system may utilize, for example, a Tensorflow model that implements responses to the specific line spectra, and then is trained on the individual types of wine. The system can be used to generate the classifiers that can classify different types of wines properly.

The approaches also include determining an image sensor type for classifying the wines. The determination of the image sensor type may also include determining what range of the spectra is needed. The applicable light spectra usually include the light from near UV to near infrared (NIR).

1.7. Determining an Imaging Sensor Type

An image sensor type may be a CMOS sensor with no filter for UV or IR. Usually, it is not an IR filter, which is used in most cameras.

The presented approach also includes determining the playback geometry of the hyper spectral classifier. The hyper spectral classifier is an end device that is used to classify wines based on an optical element, described later. If a camera looks, for example, straight down on a film plane through a container that holds some wine, the camera can image a rectangular or square holographic element having reflective dots on it at the bottom of the container.

1.8. Determining a Geometry of a Hyper-Spectral Classifier

In terms of the geometry, a position and size of each dot may be assigned to spectral lines based on their corresponding importance. When the dots are being read by a camera, they are illuminated with a light that contains the full spectrum or a couple of different lights that include partial spectra at, for example, twenty to thirty degrees off from the angle measured from the vector described by the camera viewpoint extending to the normal of the HOE plane. The spatial relationship is referred to as the geometry of the hyper spectral imager.

Once the geometry is determined, a hologram is built. The hologram has a set of certain colors which, when illuminated by light at, for example, a thirty degrees off axis, and then focused into a camera at zero degrees can reproduce the fringes.

1.9. Determining a Mapping of a Characteristic Line Spectra to an Area of an Imaging Sensor Geometry of the setup described above is important for determining hyper-spectral classifiers. This may involve determining a mapping of the characteristic line spectra to the area of the image sensor.

In this setup, a camera is focusing a holographic optical element (HOE) directly onto a CCD plane of the camera. This may include allocating the CCD resource or the pixels and the CCD to each of the line spectra based on their importance for the purpose of generating classifiers.

This may also include calculating the wavelengths and recording geometries for each holographic pixel. This step includes creating a hologram, as will be described later.

A hologram has layered fringes at half wavelength intervals that are formed based on refractive index differences. The layered fringes are the wavelengths of light that have been filtered out.

The appearance of fringes in the infrared spectroscopy of, for example, thin films significantly hinders the interpretation of chemical bands because fringes change the relative peak heights of chemical spectral bands. Thus, for the correct interpretation of chemical absorption bands, physical properties need to be separated from chemical characteristics. The corrections to the interpretation may be based on the theory of the scattering of infrared radiation at thin absorbing films.

Although scattering and absorption are connected by a complex refractive index, the scattering of infrared radiation at thin films, fringes and chemical absorbance can in good approximation be treated as additive. This may be modeled using a pre-processing technique for separating fringes from chemical absorbance by extended multiplicative signal correction. The technique may be validated by simulated and experimental spectra. (See, for example, *Fringes in FTIR spectroscopy revisited: Understanding and modeling fringes in infrared spectroscopy of thin films*, by Tatiana Konevskikh, 2015).

1.10. Transforming a Mapping of Line Spectra on an Area of an Imaging Sensor to an Array of Holographic Pixels on a Holographic Optical Element to be Fabricated In some aspects, the method of modeling used in the present approach takes advantage of an improved Bragg method developed based on Bragg's law.

1.10.1. Diffraction

FIG. 1B is an example of the Bragg approach. The depicted example is meant to illustrate Bragg's law in a simplified manner.

Bragg's law refers to the simple equation $n\lambda = 2d \sin \theta$, which is shown in FIG. 1B as an element 1B100. The equation was derived by the English physicist Sir W. H. Bragg and his son Sir W. L. Bragg in 1913. The law explains why, for example, the faces of crystals appear to reflect X-ray beams at certain angles of incidence (theta, $\theta$). The variable d (shown in FIG. 1B as an element 1B102) is the distance between atomic layers in a crystal. The variable lambda $\lambda$ is the wavelength of the incident X-ray beam. N is an integer.

The above observation is an example of X-ray wave interference, also referred to as X-ray diffraction, and pertains to the periodic atomic structure of crystals. Even though Bragg's law was used to explain the interference pattern of X-rays scattered by crystals, the concept of diffraction is also used to study the structure of the states of matters such as ions, electrons, neutrons, and protons, and the like, with a wavelength similar to the distance between the atomic or molecular structures of interest. Indeed, the Bragg law may be applied also to light spectra and other electromagnetic radiation other than X-rays.

1.10.2. Bragg's Law

Bragg's law represents the relation between the spacing of atomic planes in crystals and the angles of incidence at which the planes produce the most intense reflections of electromagnetic radiations, such as X-rays, gamma rays, and particle waves, and the like.

Bragg's law gives the angles for coherent scattering of waves from a crystal lattice. The law encompasses the superposition of wave fronts scattered by lattice planes, leading to a strict relation between the wavelength and scattering angle. The law was initially formulated for X-rays upon crystals. However, the law also applies to other types of quantum beams, including neutron and electron waves, as well as visible light at artificial periodic microscale lattices.

Bragg's law may be generalized to calculate the diffraction effects of interleaved layers with different refractive indices. In this general form, each diffraction pair may be called a 'fringe'. The spacing between fringes, and their orientation relative to an illumination source may be used to calculate the orientation and wavelength of the diffracted reflection.

In Holography, fringes may be encoded in a film using the interference of two wavefronts of light. The spacing and orientation of these fringes may be calculated by Bragg's Law.

Bragg's diffraction occurs when radiation of wavelength 2, comparable to atomic spacings, is scattered in a mirror-like reflection by the atoms of a crystalline system and undergoes constructive interference. For a crystalline solid, the waves are scattered from lattice planes separated by the distance d between successive layers of atoms. When the scattered waves interfere constructively they remain phase. They are reflected only when they strike the surface at a definite angle, the glancing angle θ, the wavelength 2, and the d of the crystal can be expressed using the following relation:

$$n\lambda = 2d\sin\theta. \qquad (1)$$

According to Bragg's law, the wavelength is a function of the incoming vector for the object beam and the reference beam. It is also used to construct the fringe spacing. Furthermore, it models the fringe spacing that will happen within the corresponding photopolymer and then reconstruct a given different wavelength.

1.11. Calculating Recording Wavelengths and Recording Geometries for Holographic Pixels The approach presented herein includes determining a spatial relationship between a camera and a laser for the optimal reconstruction. To determine the spatial relationship, the approach works backward since the wavelength is known. In this approach, a hyper spectral classifier is determined for a given dot that corresponds to a particular wavelength. Then, the spectral line and the angle of the reference beam is plugged into equation (1). In some implementations, the angle is twenty degrees. This, however, should not be seen as limiting in any way.

The fringe orientation relative to the normal of the holographic plate, and the fringe spacing during construction may be calculated by calling the construct( ) function in Addendum A using the wavelength of the spectral line to encode for that point, and the playback angles for the light and CCD used in the target consumer apparatus.

The incident angles for the reference and object beams, determined by mirror angles 104A and 104B, may be calculated by calling reconstruct( ) with the wavelength of the laser light used in the printer, and using the fringe properties set by the construct( ) call.

1.12. Constructing a Holographic Printer 1.12.1. Holography

A brief summary of holography is included herein merely to provide some background for the present approach. Making a hologram involves recording the interference pattern that occurs when light coming from a stabilized laser meets its own light bouncing back from the object it is illuminating. The key is to set up the laser, the object, and the recording film or plate in a way that captures the interference pattern as described, for example, at: https://www.integraf.com/resources/articles/a-simple-holography-easiest-way-to-make-holograms A holographic image is usually created using a laser. The lasers used in holography are often red lasers due to availability and cost. One such red laser is the helium-neon (HeNe) laser. The availability of laser diodes with high spatial and frequency coherence (single mode, narrow bandwidth) has made their use suitable for holography.

FIG. 1C is an example of an apparatus implementing a holographic technique. The depicted example is a simplified apparatus that is described herein to explain the basic concepts of holography.

The apparatus depicted in FIG. 1C, includes a light source 1C100, and a few lenses. The apparatus also includes a beam splitter 1C104. The beam splitter uses mirrors and prisms to split one beam of light into two beams.

In some geometries, mirrors are used to direct the beams of light so that one beam illuminates the object, and a second beam illuminates the holographic film allowing the two waves to form an interference pattern on the plate. Along with the lenses and beam splitter, the mirrors have to be absolutely clean. Dirt and smudges can degrade the final image.

A final element is a holographic film 1C114. The holographic film can record light at a very high resolution, which is necessary for creating a hologram. The film includes light-sensitive compounds dispensed on a transparent surface, like a photographic film. The difference between the holographic film and the photographic film is that the holographic film needs to have a very fine grain to be able to record very small changes in light that take place over microscopic distances. In some cases, holograms that use a red laser rely on emulsions that respond most strongly to red light.

To generate a hologram, a laser points at the beam splitter, which divides the beam of light into two beams, i.e., a beam 1C16 and a beam 1C120 in FIG. 1C. Mirrors direct the paths of the two beams so that the beams hit their intended targets. Each of the two beams passes through a diverging lens and becomes a wide swath of light rather than a narrow beam. One beam is referred to as an object beam, while another beam is referred to as a reference beam.

The object beam reflects from the object (e.g., an object 1C101 in FIG. 1C) and onto a photographic emulsion 1C112 of film 1C114. The reference beam hits the emulsion without reflecting off anything other than a mirror.

1.12.2. Recording a Hologram

Holograms are recordings of a wavefront of light reflected from an object. The shape of the object wavefront is recorded as fringes created by interference with the reference wavefront. Creating a hologram includes the steps that are similar to the steps involved in taking a photograph. First, a shutter opens or moves out of the path of laser 1C100 and a laser light 1C102 is split by splitter 1C104 into an object beam 1C120 and a reference beam 1C106. The light from the object beam is directed via, for example, a mirror 1C122 and becomes a beam 1C116, which then reflects off object 1C101. The light from the reference beam bypasses the object entirely. During that process, the light from both beams comes into contact with the photographic emulsion, where light-sensitive compounds react to it. Next, the shutter closes, blocking the light.

In holography, light passes through a shutter and lenses before striking a light-sensitive piece of holographic film. Just like with a photograph, the result of this process is a piece of film that has recorded the incoming light. However, when one develops the holographic plate and looks at it, what one sees is a little unusual. It does not show a depiction of object 1C101.

While a developed film from a typical camera shows a negative view of the original scene, a developed piece of film used to make a hologram does not show the negative view of the original scene. Instead, the developed film of the hologram looks like a dark frame 1C131 (in FIG. 1C) of film or a random pattern of lines and swirls. Turning the frame of film into an image requires the proper illumination to reconstruct the recorded wavefront from the object.

1.12.3. Reconstructing a Hologram Image

Typically, there are two ways of restoring a hologram frame into an image; one includes generating a transmission hologram and another includes generating a reflection hologram. In a transmission hologram, monochromatic light shines through the hologram to make an image. In a reflection hologram, monochromatic or white light reflects off the surface of the hologram to make an image. The wavefront of light from the recorded object is reconstructed by the fringe pattern on the hologram. The viewer's eye and visual cortex process this wavefront of light as though it were the original object. A camera may take a picture of the hologram, and it will show the original object from that point of view. Examples of reconstructing the hologram image are described, for example, at https://en.wikipedia.org/wiki/Holography.

1.12.4. The Effect of Bragg's Law

Bragg's Law may be used to explain the way the hologram reflects light. At different viewing angles, the Bragg effect can be different for different wavelengths of light. This means that one may see the hologram reconstruction as one color from one angle and another color from another angle. The Bragg effect is also one of the reasons why most holograms appear green even though they were created with a red laser, due to shrinkage of the thickness of the film after processing.

The fringes encoded in the hologram diffract light. When the fringes are encoded in a volume, such as a photopolymer, they form layered planes where the separation between the planes may be calculated using Bragg's Law.

1.13. Constructing a Holographic Printer

A holographic printer may be constructed to encode holographic fringes in a film. In some implementations, the presented apparatus is configured to vary the angles for positioning two beams (the object beam and the reference beam) so that they interfere at the film plane and create holographic fringes in a small discrete area. This small area may be called a holographic pixel. A holographic printer may create an array of holographic pixels and produce the array of reflective dots in the HOE described above.

The array of holographic pixels composing the HOE described above may be specified to reflect a specific set of line spectra useful for classifying and authenticating a set of materials or products.

1.14. Reconstruction

The production hologram (HOE) can be used to reconstruct many specific spectral lines from a full spectrum light source that travel through, for example, a cassette or cuvette filled with wine, and the light reflected back by the array of holographic pixels encoded to reflect these specific spectral lines. An image of the HOE may be focused onto a CCD and an image captured. The mapping of the holographic pixels onto the CCD is designed to make optimal use of the pixels in the CCD for recording the most significant spectral lines needed for classifying the wine (or other substance).

According to the present approach, a holographic printer is used to print an optical element, also called a holographic optical element (HOE). The HOE is then placed in the playback geometry with reference to a light reflected or transmitted from an object (the material to be classified) calculated as the reference angle incident on the HOE. The light reflected from the HOE at the object angle (as calculated by the construct( ) function in ADDENDUM A) is focused on a CCD. In one approach, a camera is used to focus the HOE holographic pixels reflected from the HOE, each holographic pixel reflected at the proper angle to map to a corresponding pixel element in the HOE. A full spectrum light illuminates a transparent cassette containing wine, with the production hologram laminated on the opposite side of the cassette reflecting specific spectral lines used for classification from the light to the camera. The light transmitted through the wine arrives at the HOE at a reference angle of 20 degrees from the plane of the HOE and is reflected by each holographic pixel to focus the light for the camera lens.

Figure 4A:
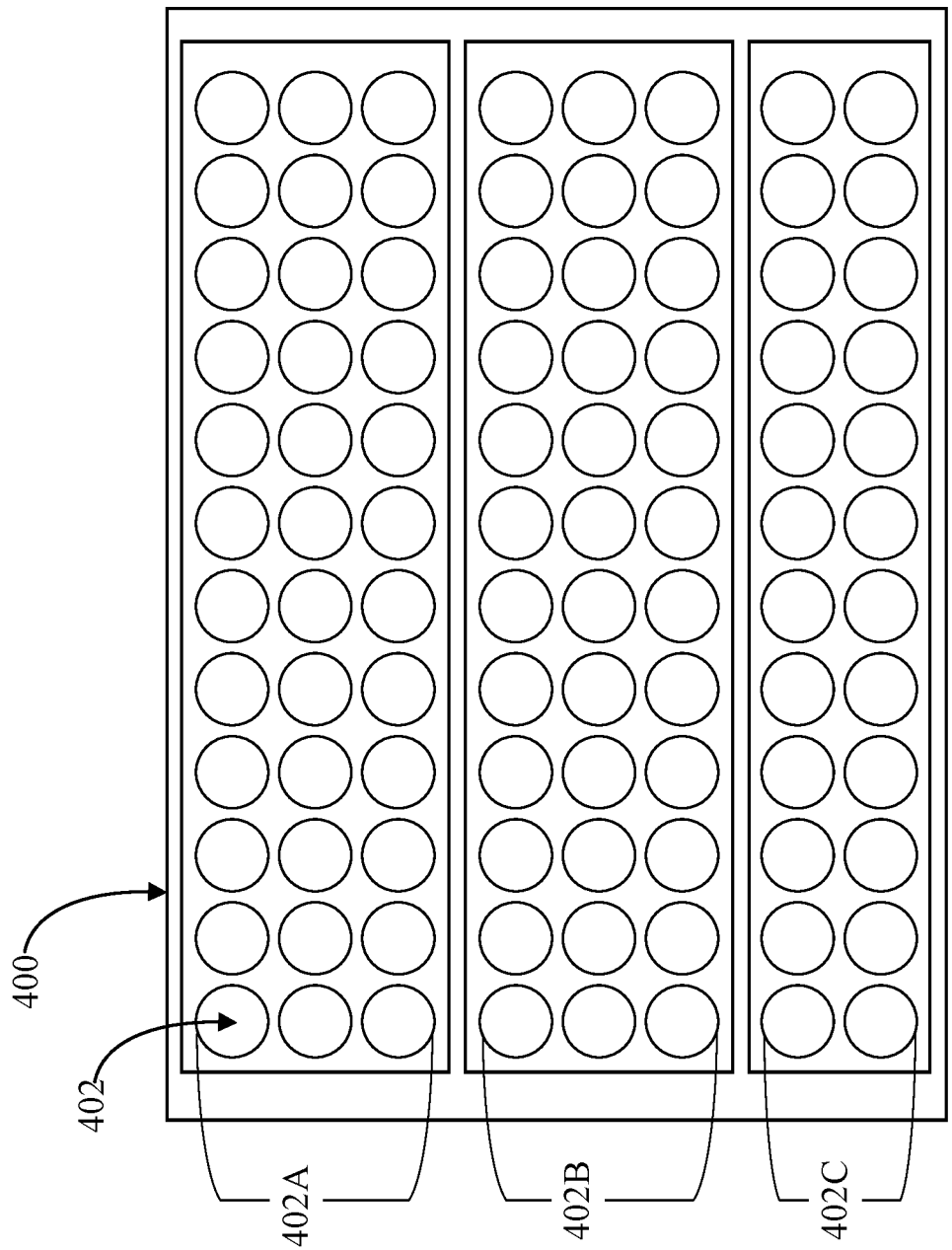
FIG. 4A is an example of a dot array.

The camera points to the HOE and captures the colors that are in that entire array and the spectral lines. The holographic printer is used to encode the wavelengths for which data needs to be recorded in each holographic pixel (i.e., for each one of the dots shown in, for example, FIG. 4, a dot 402). FIG. 4A is described later.

Certain wavelengths need to be reflected as they are used to determine characteristics of wines. In order to measure the reflected wavelengths, one needs to set up a reflection hologram for the corresponding dots that reflects a plane with a specific color.

Given a reconstruction beam having a variety of colors (the full spectrum needed for classification), each holographic pixel will reflect a specific color. One way to do that is relying on the fact that, in the hologram, there are constructive interference fringes at certain distances from each other. The light that is reflected or reconstructed from those interference fringes was discovered by Bragg, who wrote an equation referred to as Bragg's law (described above).

In the present approach, the Bragg equation is considered as depending on the angle of the input light. The light is reflected from the layers of interference fringes based on their spacing between each other. That relationship is used to determine the color that is reflected from the dots.

1.15. Generating Instructions for a Holographic Printer

A holographic printer is constructed to use one wavelength of laser light at the time to construct the resulting holographic elements. To record the fringe spacing needed for each color (spectral line) the recording angle needs to vary. The angles that a reference beam and an object beam hit a dot (in the array depicted in FIG. 4A) are used to construct the corresponding fringe pattern for each dot. Then, the reflections from the object are used to analyze the spectral components. Once all of the wavelengths that are needed to create the hologram are known, and the playback geometry is known, the fringe spacing and orientation for each holographic pixel (a dot in the dot array) may be calculated using the construct( ) function in ADDENDUM A. This fringe orientation and spacing may be encoded by calling the reconstruct( ) function with the wavelength of the laser used in the holographic printer to find the angle of incidence at the holographic place for the object and reference beams. Code in the HoloPix application will send instructions for a holographic pixel to the holographic printer to set the position of the XY-stage (the location of the holographic pixel on the plate) the orientation of the Object- Beam Goniometer (the incident angle of the object beam) and the orientation of ReferenceBeam Goniometer (the incident angle of the reference beam). It will then turn on the laser (or open a shutter) to expose the holographic film to form those precise fringes at that location.

1.15.1. Placing a Camera

The camera needs to be placed in a manner consistent with the playback geometry. That is, it needs to be in the same position where each of the holographic pixels reconstructs the proper wavelength of light. Each dot needs to be illuminated at a particular angle. Once the reconstruction geometry is set, and a sample recorded, the results may be used by the classifier.

1.15.2. Light Path

In one implementation, light may travel through a cassette or cuvette containing the object to be classified, and be focused upon the HOE, where the HOE may focus the light directly on a CCD. This is a direct transmitted light geometry.

In another implementation, light may be reflected from the object to be classified, collected by lens or mirror, and focused upon the HOE, where the HOE may focus the light directly on a CCD. This is a direct reflected light geometry.

Figure 3A:
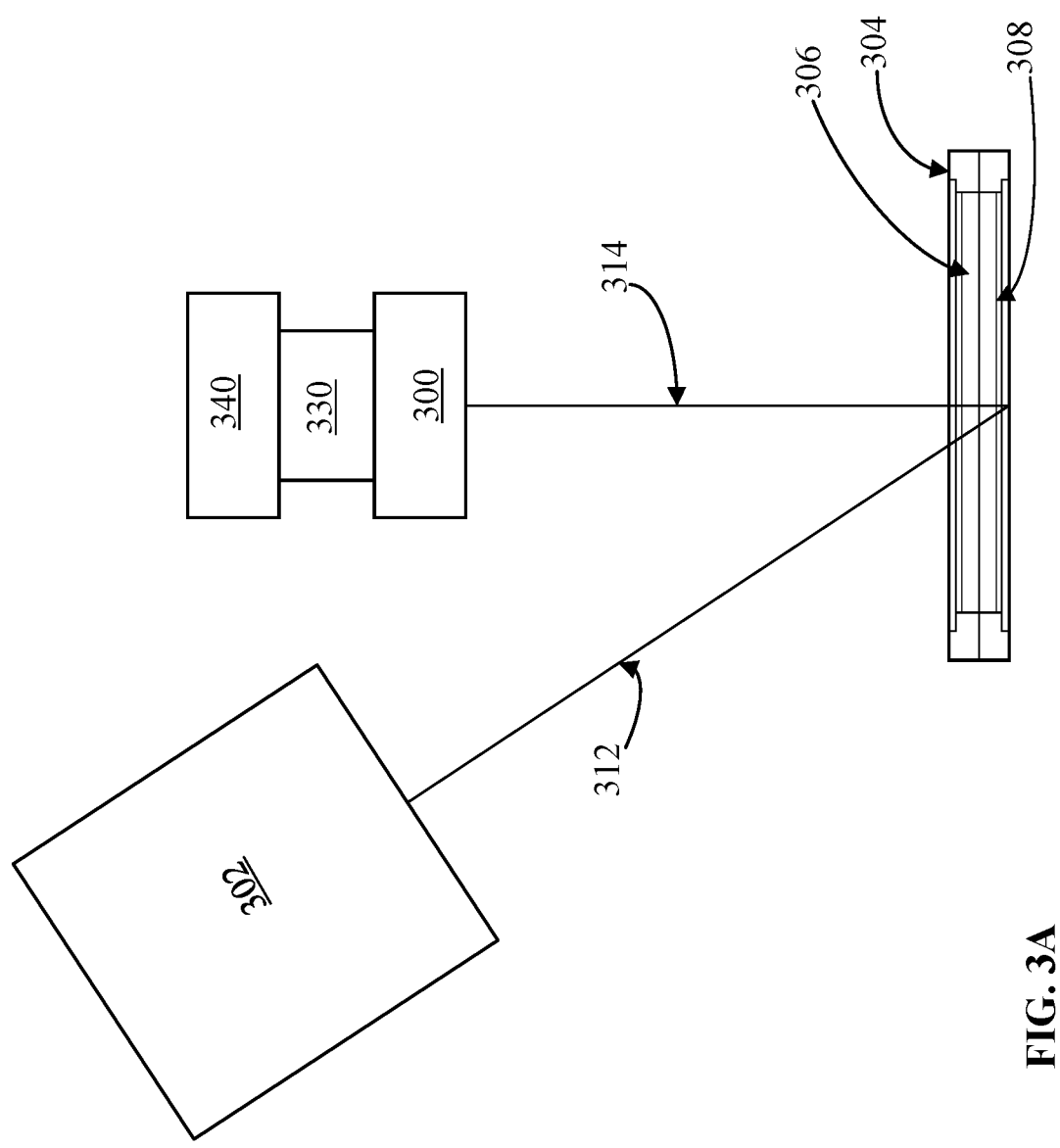
FIG. 3A is an example camera set up according to one embodiment.

In the implementation described in FIG. 3A, light may be passed through the object to be classified, reflected from the HOE, passed through the object a second time, and the resulting image focused upon the CCD by a lens. In this geometry, the HOE is imaged upon the CCD by a camera, so it may be called a transmission hyper-spectral image.

FIG. 3A is an example camera set up. In FIG. 3A, a camera 300 is pointing straight on a holographic film 308 placed on the side of vessel 304, opposite from the camera. A light 314 is illuminating from holographic film 308 and is sent through vessel 304 containing a liquid 306 (e.g., a wine sample that is to be characterized).

In FIG. 3A, a light 312, from a source 302, passes through the liquid, and then goes toward the camera. In some implementations, the light is coming in at twenty degrees, and it is being filtered twice before it goes through the liquid, both traveling through the liquid to the HOE, and then when it is reflected back toward the camera. The angle, however, may be different in other implementations.

Holographic optical element 308 may be used to filter the light that is transmitted through liquid 306. The holographic optical element and all corresponding dots (described in FIG. 4A) are at the back of vessel 304.

The vessel includes, for example, two sheets of glass that transmit light 312 from the near ultraviolet all the way through the near infrared from a light source 302. Typically, the light source is a full spectrum source.

Light 312 will go from light source 202 through the glass of vessel 304, through the liquid that is contained within that space between the two sheets of glass. The light reflects off the dots of holographic optical element 308, each one configured to filter a specific wavelength of light. Finally, the light, now as light 314, is recorded by camera 300 through lens system 330, and then recorded onto a CCD at 340.

1.15.3. CCD

A CCD, such as CCD 340 in FIG. 3A, is a CMOS CCD device that is sensitive from near ultraviolet at ~200 nm to near infrared at 1020 nm.

A software application may be used to read the CCD and determine the response to the illumination. For each one of the dots (described in FIG. 4A), the device is calibrated with an empty vessel 304 (no liquid in the vessel). This is referred to as an initial calibration step.

Then, when a liquid is placed in vessel 304, by sending light along paths 312-313, the wavelengths that are absorbed by the liquid can be determined. This provides the absorption spectrum for the liquid, as is common in absorption spectroscopy. The difference in this implementation is that the recorded wavelengths have been tuned to those that are needed for classifying a specific set of materials or products (such as wine).

The above process allows determining, for each dot of the dots (described in FIG. 4A), the fringe angle and the fringe spacing. This is determined based on the Bragg law, described before.

The recording of holographic fringes is described above in the construction of a holographic printer.

Bragg's law is used herein to determine the spacing or d (element 1B102 shown in FIG. 1B. The spacing d is the fringe spacing. The input beam has an angle to the fringe. If d is known, then one can determine the wavelength of light that would be reflected from the particular fringes.

The fringe spacing and orientation for each holographic pixel (a dot in the dot array) may be calculated using the construct( ) function in ADDENDUM A. This fringe orientation and spacing may be encoded by calling the reconstruct( ) function with the wavelength of the laser used in the holographic printer to find the angle of incidence at the holographic place for the object and reference beams. Code in the HoloPix application will send instructions for a holographic pixel to the holographic printer to set the position of the XY-stage (the location of the holographic pixel on the plate) the orientation of the ObjectBeam Goniometer (the incident angle of the object beam) and the orientation of ReferenceBeam Goniometer (the incident angle of the reference beam). It will then turn on the laser (or open a shutter) to expose the holographic film to form those precise fringes at that location.

The fringe may be encoded by executing a software application designed for that purpose. An example of such an application is the HoloPix application (included in the ADDENDUM A included below).

The HoloPix application defines a data structure that holds the information about the fringe pattern created for reflecting a specific frequency of light. This data is the fringeAxis and its rotation angle, fringeTheta, which describes the orientation of the fringe plane, the fringe normal, which is the normal vector to the fringe plane. It also defines fringeSpace, which is the spacing between the fringes.

When two wavefronts of collimated light interfere, the interference pattern is composed of layered planes, as defined by Bragg's Law. The constructive interference portion of the pattern is called a fringe. The construct( ) function in ADDENDUM A uses Bragg's Law to determine (or construct) the geometry of the interference planes, or fringes. It sets the orientation and spacing of these fringes, as they would be recorded in a hologram.

In some embodiments, the approach starts with a wavelength that corresponds to a dot for which a hologram part is to be created in a holographic optical element. Therefore, one uses the wavelength that is already known and uses the reference beam that needs to come in at, for example, twenty degrees. This allows determining the angle of the fringe spacing with the reference to the plate.

In the next step, the fringe spacing is being used. Based on the fringe spacing, one reconstructs another wavelength, and that wavelength will be recorded in the hologram.

Typically, all the wavelengths are used. For example, a blue wavelength will be in the range of four hundreds of nanometers. Based on that, one can determine the fringe spacing and the angle for the wavelength. Given the geometry, one needs to set the holographic printer with the wavelength, and then determine where the reference and object beams should be pointing to figure out where to reconstruct that the fringes.

This approach encodes the physics principles pertaining to determining a given fringe spacing at a certain orientation of the plate. Since one knows what wavelengths need to be reconstructed, one can determine what the fringe spacing is, and what angle needs to be by using the geometry, as shown in FIG. 1B.

1.15.4. Addendum A

Typically, the angle in the holographic printer needs to be set using the object and reference beams to record the corresponding fringe spacing. An example of a program for doing that is included in the ADDENDUM A (included at the end of this document). The code is used to determine that, if the input data are provided, then the spectra and the holographic optical element for each dot can be determined.

Typically, a goniometer or any other active element can be used to change the angle for the reference beam and the goniometer 104A can be used to change the angle for the object beam. For instance, goniometer 104A (shown in FIG. 1D-FIG. 2) can move back and forth, so that the beam moves across the surface of a lens 120A, that then refocuses at the same spot 102 so that the amount of movement in 104A needs to allow the angle range following on 102 at one point or at least plus or minus five degrees.

Then, the linear stage of 205 is an XY linear stage composed of an X component of the linear stage and a Y component of the stage. The stages move so that each dot can be recorded as a separate recording. They all move in sync. Hence, if 104A moves up left, then 102 and 205 move as well. They move to match the corresponding vectors that are plugged in the reconstruction process.

The adjustments are synchronized in X and Y directions, and the adjustment may be performed either manually or using the little motors.

For example, once one pulls a trigger the position adjustment may be performed automatically, each one of the angles needs to record for each position on the plate. This can be automated.

A table supporting 205 can be any type of table, including an optical table with an air suspension. It is important to find out the geometries and the colors that need to be recorded because it is important to find out the angular differences that need to be recorded. Thus, the structure of the holographic printer is designed to record the corresponding angular differences.

As described above, the object beam and the reference beam travel the same distance. The phase of the light is used to record an interference pattern well within a coherence length. The geometry of the holographic printer is constrained by the length of the distance that the beam has to travel, having the right angles for recording of the different fringes that need to be recorded.

Then the plate is moved, and so are the angles of the reference beam and the object beam to allow recording the fringes.

1.16. Printing a Master Holographic Optical Element

Fringes are created by constructing a hologram, and more specifically, by two beams (i.e., a reference beam and an object beam) and the corresponding constructive interference and destructive interferences. This results in creating both bright fringes and dim fringes in the emulsion. The emulsion may include a photo polymer.

A photo polymer changes its refractive index in response to light. This response is used to capture the fringes. In the approach presented herein, the spacing between the fringes and the angle of the fringes are determined by the line spectra that are needed to classify a specific set of materials or products. The fringe spacing for each holographic pixel in the HOE array may be calculated from Bragg's Law. The construction geometry to create the fringe spacing for each holographic pixel with a single wavelength of laser light may also be calculated by Bragg's Law. A holographic printer is built to encode each holographic pixel's fringe spacing and fringe plane orientation.

1.17. Testing

When a master HOE has been constructed using a holographic printer, it may be tested using the reconstruction geometry. The HOE is placed in the playback (or reconstruction) for a specific implementation, as described above.

An initial test may be performed with a spectrometer to determine that the HOE is accurately reconstructing the spectral lines of a variety of illumination sources.

The implementation of the playback device may be further tested by using it with the classification software to classify the initial set of materials (or products, in one case specific wines). If the HOE is able to provide the classifier with the proper spectral lines to accurately classify the training set, it may be further tested. If the classifier is unable to use the input, the spectral line inputs may need to be adjusted in software based on a color shift observed in spectroscopy tests.

Finally, a specific implementation of a playback device with the HOE may be tested on members of the training set that were withheld for such a test.

1.18. Using a Master Holographic Optical Element to Fabricate Production Units

In some implementations, the presented approach implements a fast way of replicating a master hologram. The simplest way is to illuminate all the holographic pixels by the same angle as the angle of a reference beam. This would correspond to taking the master and placing it in contact with an unexposed holographic film exposing the photopolymer and exposing it with the reference beam. This basically allows the master to reconstruct the object beam and make a copy of the master.

While that is the simplest way to generate copies of a master holograph, it may not work entirely because there are many different reference beams and because one has to change the angle of the reference beam for each of the pixels.

Another way is to just add one or more holograms, which will be in addition to making the master. In this way, one uses a separate referencing, including a single reference beam at another angle. It recreates all of the reference beams that were used to create the master hologram. This allows printing with the same printer that was described above.

In this approach, one first prints a master, and then prints a hologram that is essentially a reference beam master. Then, the two are put together.

Both of them can be exposed. The reference will be placed in front of the master. The master will be in contact with the copy onto which an exposed holographic film copy to be made, and then one can just expose the reference beam master. That allows recreating all of the reference beams that were used to make the original master and copying the master with one exposure onto a copy.

This amounts to recreating the master hologram that includes playing back the reference beams that were used to create the master and playing back the object beams. This will result in making an exact copy. Hence, to make a hologram, the angle of the reference beams that came in to expose the master needs to be encoded.

To do that, one can use the same holographic printer and record just the reference beams. This requires recording the reference beam orientations and keeping the object beam orientations constant. To do that, one needs to recreate the reference beams using the same construction set. That is why the presented approach includes making one more master (i.e., an additional master of the optical element).

Once the master HOE has been tested, production copies may then be printed with a single exposure.

1.18.1. Copying a Master Hologram

Figure 3B:
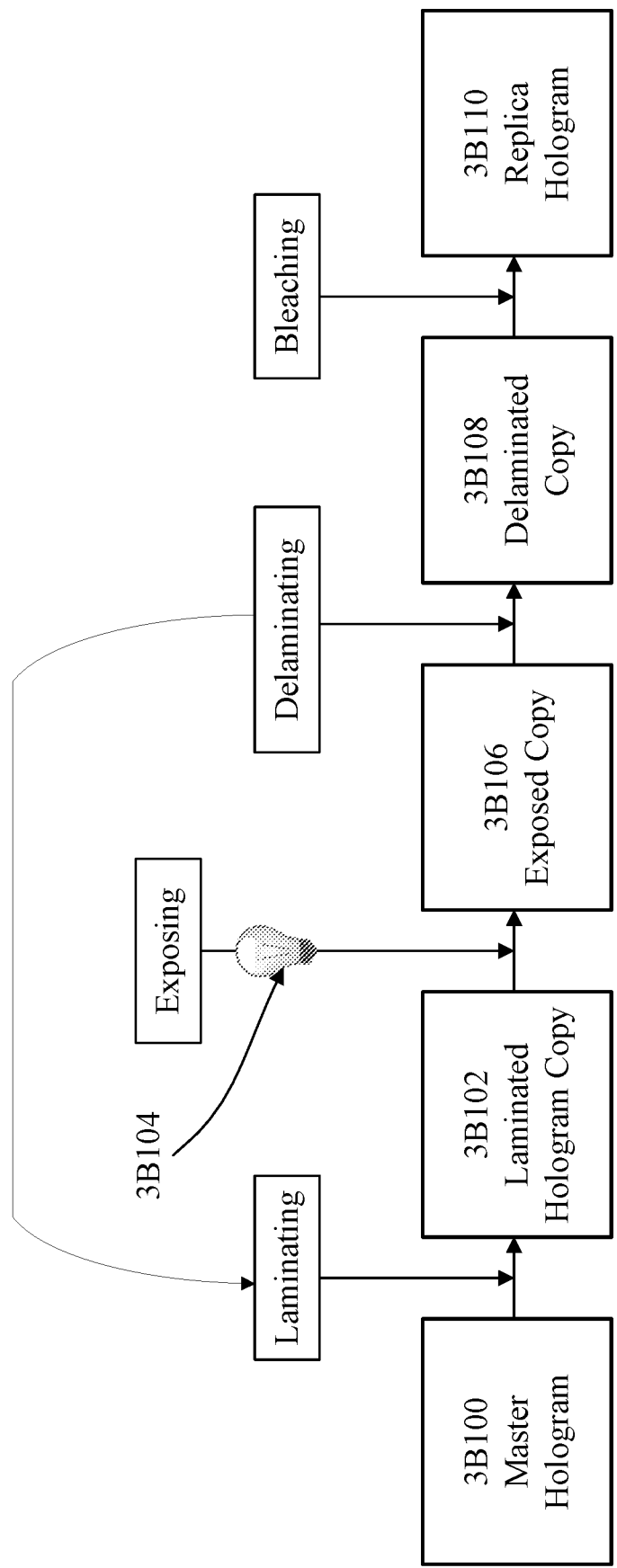
FIG. 3B is an example of copying a master hologram.
Figure 9:
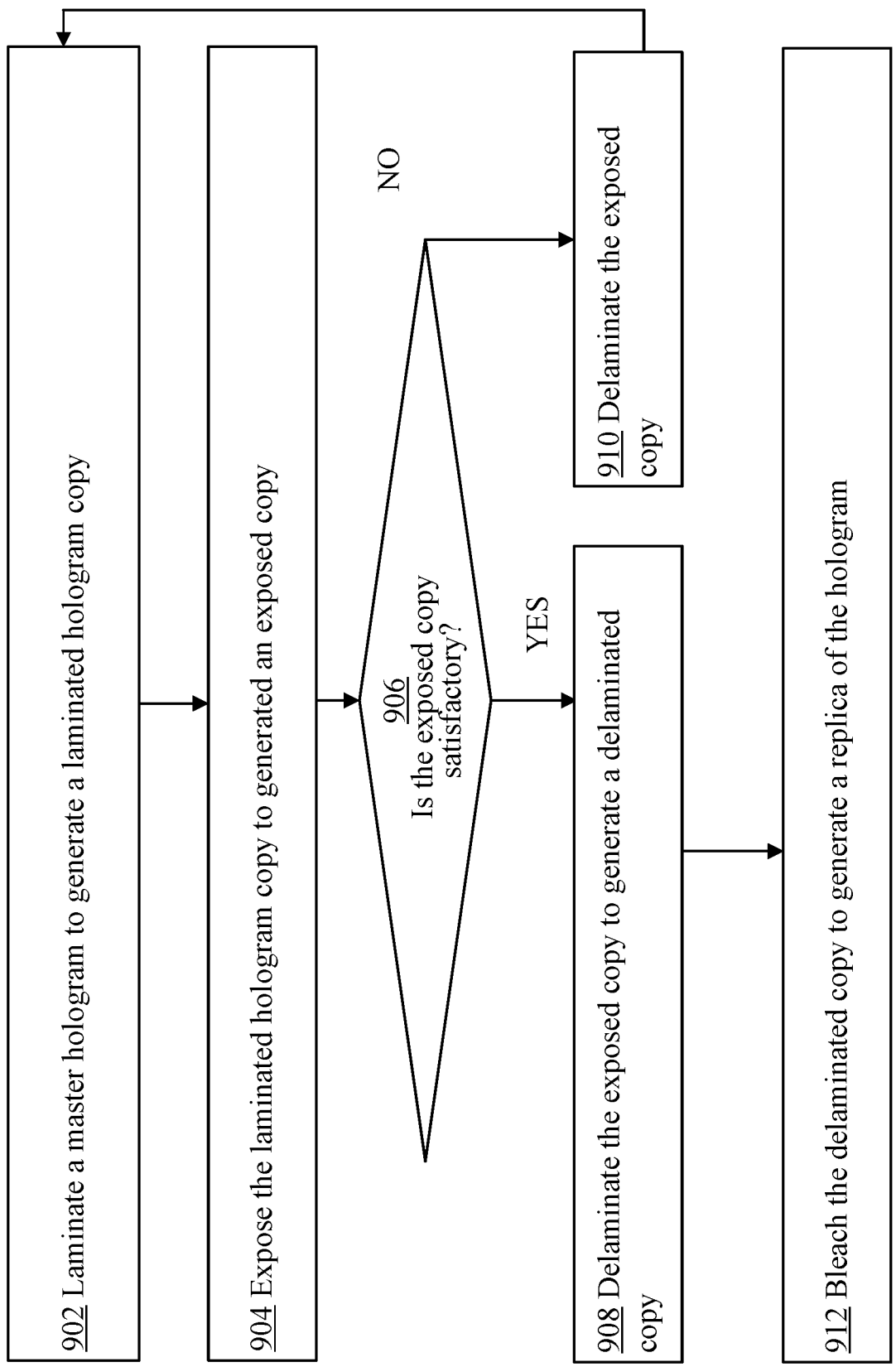
FIG. 9 is an example flow chart of a master hologram copying process according to one embodiment.

FIG. 3B is an example of copying a master hologram, and FIG. 9 is an example flow chart of a master hologram copying process according to one embodiment. As shown in FIG. 9, in step 902, a master hologram 3B100 (shown in FIG. 3B) is laminated to generate a copy film 3B102 (shown in FIG. 3B). Holographic lamination can be used for many decorative purposes. It is typically used on greetings cards, postcards, brochures, labels, DVD covers, book covers and cartoons.

Holographic lamination can be used to add something special to the hologram. When laminated over dark colored print, the pattern can really pop. Further, placing over a range of printed colors offers different intensities of the pattern. Also, gloss varnishing has the effect of switching off the holographic pattern, increasing the design possibilities.

As with other types of laminate, holographic lamination also offers print protection and is water and grease resistant. Laminating printed media can prevent them from becoming creased, faded, water damaged, wrinkled, stained, smudged, or marked by grease or fingerprints. There is a wide variety of laminates available, from gloss and matt OPP to soft-touch lamination (that gives a silky smooth touch).

Laminates can also be used to add a holographic pattern effect. There is a range of holographic patterns available, from rainbow to stars, each provides a different effect, whilst still protecting the print.

In step 904, the hologram is copied by exposing laminated copy 3B102 (shown in FIG. 3B) of the film using a light source 3B104 (shown in FIG. 3B) to generate an exposed copy 3B106 (shown in FIG. 3B).

Exposure may include subjecting the laminated copy with light coming from a light source. The exposure can be carried out by applying, for example, ultraviolet light from a super-high pressure mercury lamp through a chromium trimming mask. This allows shielding only the central portion of the laminate region of the photosensitive laminated copy and exposing the peripheral portion In step 906, a test is performed to determine whether the exposed copy is satisfactory. This may include determining whether the exposed copy is sufficiently exposed for the purpose of generating a copy of the hologram.

If the exposed copy is satisfactory, then step 908 is performed. Otherwise, in step 910, the exposed copy is delaminated, and step 902 is performed.

In step 908, the exposed copy is delaminated to generate a delaminated copy 3B108 (shown in FIG. 3B). Delamination is a process designed to reverse the lamination.

In step 912, the delaminated copy is bleached to generate a replica hologram 3B110 (shown in FIG. 3B).

Chemical bleaching of holograms produces phase holograms that exhibit higher light efficiency than the holograms from which they were produced. The bleaching may be performed using various chemicals, including mercuric chloride, Kodak chromium intensifier, and the like.

1.18.2. Variations

Printing the master holographic element may include integrating the holographic optical element with the imaging sensor and the hyper spectral classifier. Once a copy of the holographic optical element is made, the copy could be used as an actual master. Then one needs to integrate it with the physical setup of the hyper spectral imaging device, as shown in FIG. 3A.

The holographic optical element is adhered to a sheet of transparent glass. It is usually a special glass that basically transmits at near UV visible through NIR, and it is adhered with an adhesive film that index-matches the surface of the hologram that is adhered to the glass with the emulsion side.

The choice of adhesive film is important because some adhesive films will change the thickness of the photopolymer, and, therefore, may cause a shift in wavelength. In some implementations, a very thin silicon film is used. Its index matches the surface of the hologram using the glass.

The glass is adhered to the holder. One pours a liquid into the holder and exposes the holder to the full spectrum light from the near UV visible and into the NIR. The light goes through the glass at the front. It goes through the liquid that is to be characterized, bounces off it, and goes through the glass and the backplane. The light then bounces off the hologram and then is transmitted to the camera 300 (as shown in FIG. 3A).

The lens focuses on the plane of the hologram and directs the light onto the plane of CCD 340 (as shown in FIG. 3A). This allows measuring the color of each dot.

The device needs to be calibrated by taking a picture with no substance in the container (there is just air or water; the water would be best so that each dot in the hologram would be with no absorption).

Then one puts into a holder some liquid or material one wants to study and records the difference between the calibrated case and the case with the substance that is to be tested. This is typically done by analyzing the spectral lines at each one of the dots, and determining how much of the light was absorbed at that spectral line. This is based on spectroscopy.

Absorption spectroscopy looks at light transmitted or reflected from a material at certain frequencies as the light is absorbed by molecular interactions. In the present approach, one receives the spectral response to the substance that is placed in the holder. Stating differently, instead of having a prism in place, the present approach uses the response images of each of the colors in the hologram. Therefore, this approach is referred to as hyper spectral imaging rather than spectroscopy.

The production hologram may be fabricated for authenticating many kinds of wines, based on the accuracy of a given classifier to detect each wine from the chosen spectral lines. Some wines may include ethanol, methanol, and the like. Red wines, for example, usually have high levels of the tannic acid. In some embodiments, a hologram is designed to specifically look at white and red wines.

In testing (i.e., in a production phase of the present approach), The device designed to play back HOE with the set of material and the classifier designed for that device are presented with first the original training set to validate that the device/classifier pair are working, then tested against items that are similar to the training set, but not authentic, to test that these items are identified as such. The same classifier that was used in a training phase and that pertained to the UV-NIR light range can be used in the product phase. The classifier may be used to test, for example, wines, and may be used to show the relationships between the particular lines and the absorption of the wine sample.

1.19. Example Applications

The above described approach has many applications. For example, it can be used to classify wines. For example, it can also be used to determine the type of the wine.

There are also other applications. Suppose a wine producer is concerned with making sure that his wine is not being counterfeited by others. Since some of the wines may cost thousands of dollars, the buyers want to be assured of the quality of the purchased wines and the producers want to make sure that the buyers can easily verify the authenticity of the wines and easily identify the copycat bottles fraudulently offered by others.

Many companies, such as Patrimony Wines from DAOU VINEYARDS, LLC, PASO ROBLES CA, may be in the business of selling wines costing more than $1000 US. Therefore, they would not only like to track the wines and have, for example, a seal of authenticity to each bottle, but also provide an authorization service available online or over the phone. The seal of an authenticity may be encoded in, for example, a QR code attached to the bottle, the bottle label, and the like. The codes may be stored in a central computer system available to the producers and collectors.

The service should provide a way of verifying whether the wine is indeed the authentic wine or a knock-off. To provide that service, a service agent may use the above described setup and observe whether the spectral response obtained for a wine sample taken from a particular wine bottle matches the spectral response obtained for the authentic wine claimed on the label of the particular wine bottle.

The presented approach may also be implemented in restaurants. Suppose a guest in a restaurant has ordered a bottle of a very expensive wine. To make sure that the wine served to the guest is indeed the wine that he has ordered, the guest may use the presented setup and easily verify the authenticity of the wine.

In some embodiments, the approach utilizes a machine learning system to classify the line spectra. The machine learning system can be trained using various light spectra to distinguish, for example, the wine that is sweet from the wine that is dry, a wine that has certain fruit notes, or a wine that pairs well with a specific dish. Then, if a user wishes to order/purchase the wine that matches the user's taste, the system trained using the machine learning method may generate the wine recommendations for the user.

The training may include a process in which, after a series of tastings, a taste profile of qualitative characteristics is created and saved in, for example, a database. A classifier may be trained to associate certain wine spectra with specific levels of the human qualitative experience of taste. Hence, if a customer wants to know, for example, which wines include which wine notes, the wines may be identified.

Furthermore, the presented approach may be used to recommend the wines to users and collectors.

1.20. Example Wine Classification 1.20.1. Relation Between Light Wavelengths and Absorption Selection of the most important wavelengths for a wine classification is usually made using a training set. It has been noticed that for the red wines, the global accuracy of the wavelength selection does not seem to improve when more wavelengths are added past a certain number of samples. In fact, in some cases, training the classifier with a larger number of variables negatively affects the resulting accuracy. Specific wavelengths (line spectra) may be determined as useful for classification by several approaches. One in the presence of an absorption feature (a signal that a specific spectral line has decreased in amplitude from the calibrated state of the device). Another is the absence of an absorption feature in a subset of the training set. A third is the change of the shape of a broad absorption curve. This last feature may require that a region of the spectrum be sampled, but at a lower sampling resolution (spacing between spectral lines) Another means to select useful wavelengths for specifying the characteristics of each holographic pixel in the HOE is to train several classifiers with randomized sets of additional spectral lines and test the accuracy of each.

Figure 4B:
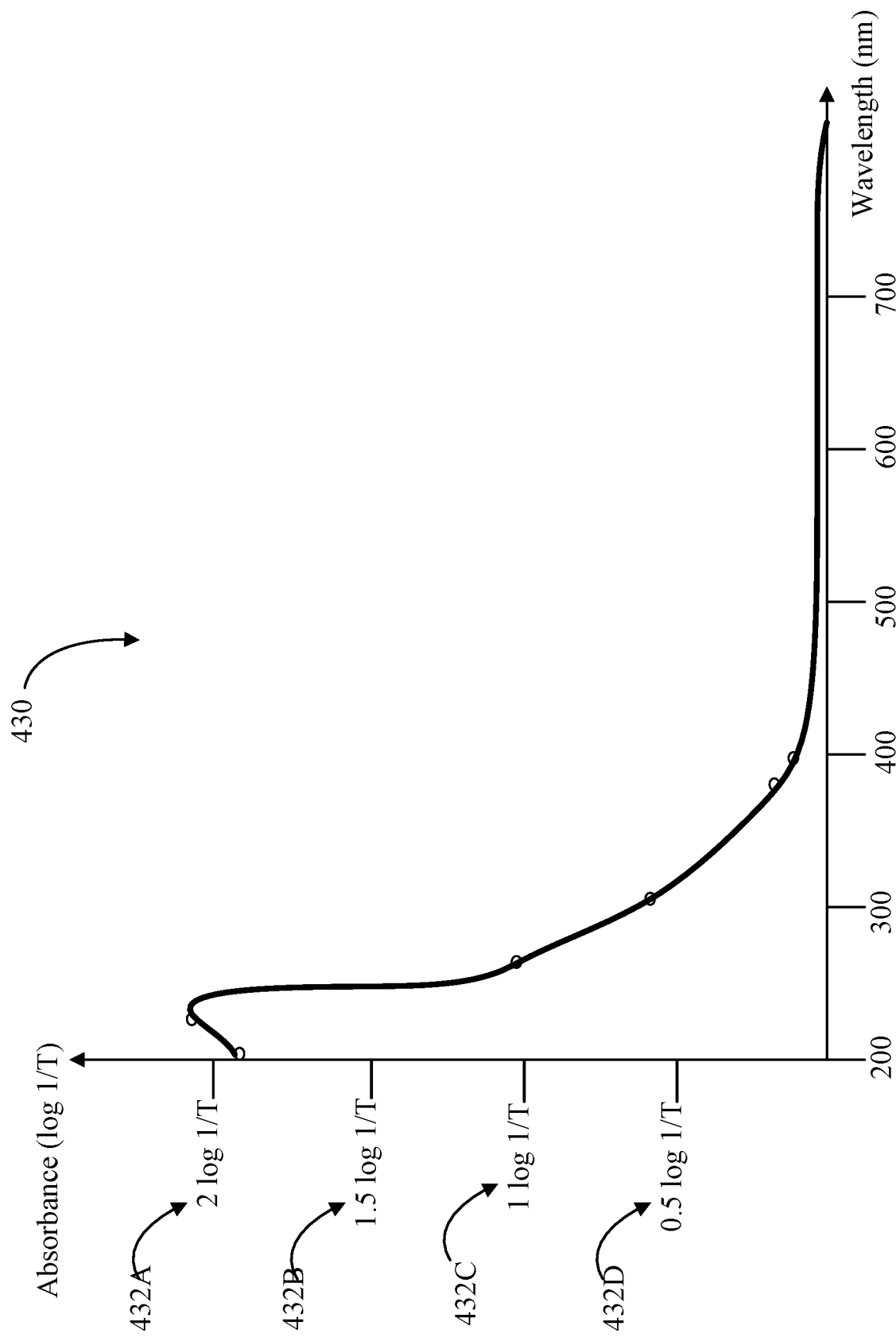
FIG. 4B is an example of selected wavelengths for white wines and representative spectra.

FIG. 4B is an example of selected wavelengths for white wines and representative spectra. FIG. 4B depicts a graph 430 of an absorbance plotted against a set of wavelengths in a range 200 nm-700 nm that appear to be relevant for classifying various wine wines based on absorption of the light by the wine. The absorption is represented in the Y axis in FIG. 4B; more specifically, FIG. 4B shows an absorption of 2 log 1/T (element 432A), 1.5 log 1/T (element 432B), 1 log 1/T (element 432C), and 0.5 log 1/T (element 432D). The relevant wavelengths are shown as representative spectra for a certain class of white wine. The graph shows that the certain wavelengths are useful in separating the different wines based on their respective absorption of the light.

The relevant wavelengths in the discrimination of white wines fall within the range of 240-400 nm. The range of key variables, 290-800 nm, also includes the visible and NIR wavelengths which most likely reflect the presence of anthocyanins, their derivatives, and/or other phenolic compounds. It appears that the profile of wine anthocyanins is affected by the variety of grape and the vinification technique.

Relationships between a set of selected wavelengths and red wines may also be determined based on a training set. It appears that absorbance of the wavelengths of 290, 330, 360, 490, 540, 610, 650, 760 and 800 is often indicative that the tested wine is red wine.

1.20.2 Relation Between Light Wavelengths and Wines

FIG. 4C is an example of some relevant wavelengths after a feature selection. The depicted example shows a relation between a wine type 440A and wavelengths 442A for which absorption of the corresponding wavelengths was significant.

Based on the depicted table, wavelengths 240, 260, 280, 310, 340, 360, 390 appear to be indicative of white wines 440B. This is because the light absorption for those wavelengths in white wines appears to be significant.

Furthermore, based on the depicted table, wavelengths 290, 330, 360, 490, 540, 610, 650, 760, 800 appear to be indicative of red wines 440C. This is because the light absorption for those wavelengths in red wines appears to be significant.

The above examples are provided merely for illustrative purposes. In other implementations, the relationships between light wavelengths and wines may be different to some extent.

1.20.3. Example Placement of Spectral Lines for Authenticating Wines

Figure 4D:
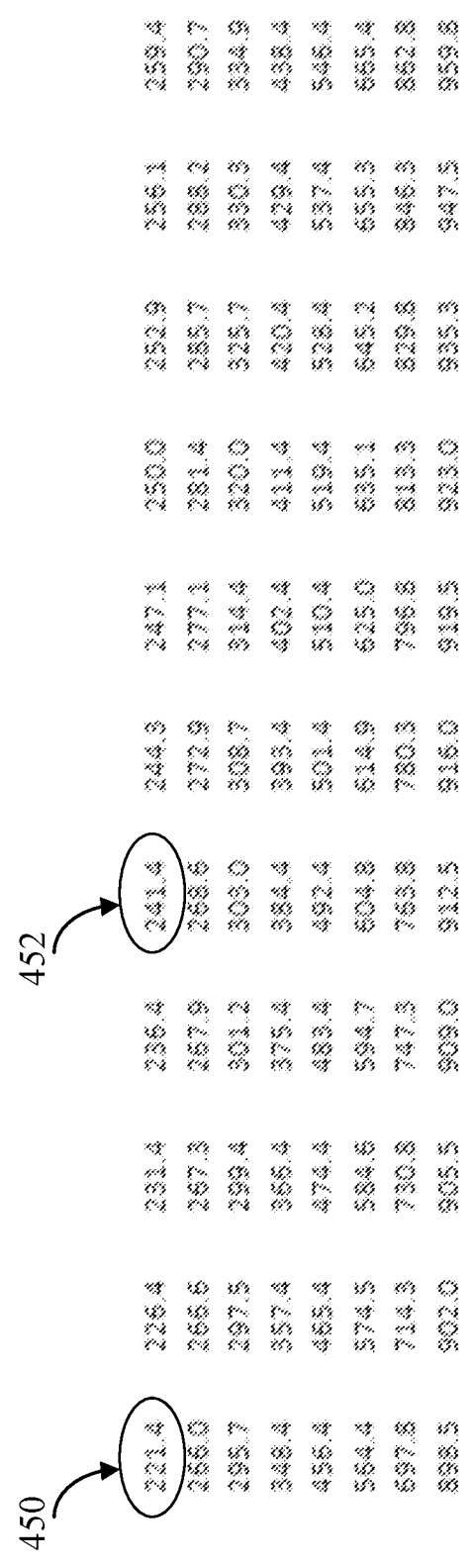

FIG. 4D is an example depiction of spectral line placement for wine authentication. The depicted example shows a placement of spectral lines for authenticating red/white table wines in a 12 by 8 matrix. The arrangement of the columns and rows in the example depicted in FIG. 4D corresponds to the arrangement of the columns and rows shown in, for example, FIG. 4A.

As shown in the example depicted in FIG. 4D, an element 450 that is in a first column and a first row in the depicted table, is 221.4. That indicates that for that spot in the table shown in FIG. 4A, the absorption of the light was taking place for the wavelength of 221.4 nm. However, as shown in FIG. 4C, there is no indication that the absorption of the wavelength of 221.4 nm implies that the sample was either white or red wine.

Based on the table shown in FIG. 4C, it appears that, for example, if the absorption happens for the wavelength of 240 nm, then such absorption may be indicative of white wine. However, there does not seem to be a record of the wavelength of 240 nm in the table shown in FIG. 4D. The closest wavelength to 240 nm in the table shown in FIG. 4D is element 452 (see a column 5 and a row 1) is wavelength of 241.4 nm. A classifier trained to determine if the wine sample was red or white may return a lower confidence that the wine was a red wine in this case. The above analysis may be performed for each element in the table depicted in FIG. 4D to determine whether the type of wine for which the wine sample was tested.

1.20.4. Example Computer Configuration for Analyzing Spectral Lines Placements

Figure 4E:
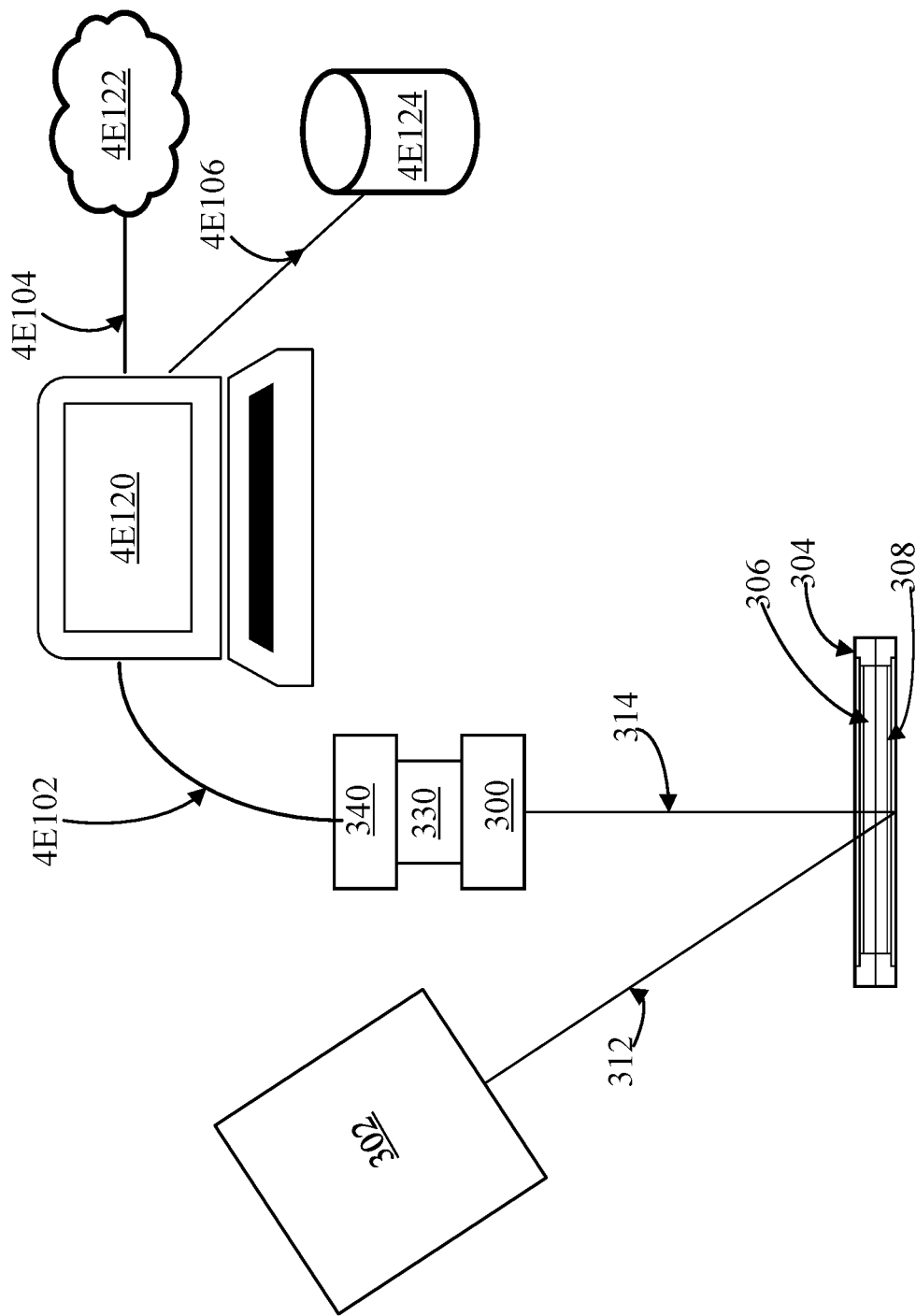
FIG. 4E is an example of a computer configuration for wine authentication.

FIG. 4E is an example of a computer configuration for wine authentication. FIG. 4E depicts most of the components also depicted in FIG. 3A. But, in addition, FIG. 4E shows a computer 4E120, which may be used to receive, via a communications link 4E102, an output from element 340, processes the received output (e.g., translates the analog signals to the digital signals), and transmits, via a communications connection 4E102, the results to a storage system 4E122, a data storage system 4E124, or both.

2.0. Example Approach 2.1. Classification of Red and White Wines-Addendum B

The classification of red and white wine may be illustrated in reference to ADDENDUM B, included below. ADDENDUM B includes a table that may be used to classify the wines and determine their authenticity. For example, a wine collector or a wine aficionado may rely on the wine classification to determine whether a bottle wine indeed contains the wine that is indicated on the label affixed to the wine bottle.

Using the classification, one may determine, for example, whether the wine is a Cabernet, Merlot, Pinot Noir, or the like. Furthermore, the one may determine whether, for example, the wine has been produced from the grapes harvested from the Russian River vineyards in California.

2.2. Examples of Training Set

The classification may be determined using an apparatus that comprises optical and mechanical components as those depicted in FIG. 1D and FIG. 2. As described before, the apparatus may be configured to generate a broad spectral light beam and project it through, for example, a wine sample, and then measure the absorption spectra of the wine sample.

The apparatus may include a spectrometer with an extended range that is configured to sense and process waves in the range from nanometers (or hundreds of nanometers) to an infrared spectrum (having a frequency range 1013-1014 Hz and a wavelength range 25-2.5 µm).

The light beam may be a beam that produces light across that entire range in a fairly continuous way through one hundreds of continuous spectra. The light passes a wine sample which absorbs some light spectra, and on the receiving side, the received light data is collected, the data filtered as described above, and the normalized spectrum for each wine sample stored. The stored samples may be used to train a classifier. The specific line spectra used to train the classifier may be limited as described above. The training feedback for the classifier may be varied. In one embodiment it may be to authenticate specific wines. In another embodiment it may be to associate the wine spectra with a qualitative taste profile.

2.3. Examples of UV-NIR Spectra

The light analysis in the present approach may include looking at a wide range of spectra, and then determining, for example, the wavelengths that are specific to particular characteristics of the wine. This may include determining specific wavelengths in the nanometer range as well as in the infrared range.

Referring again to ADDENDUM B, in ADDENDUM B, the term "interpolate sample" indicates that the data have been collected using regular interpolations until the next spectral difference is detected. This provides a baseline for the spectral difference that is coming up in the next wavelength. So, rather than reading only the spectral differences, the present apparatus also indicates the interpolant samples.

The wavelengths may be analyzed to determine, for example, the differences in the spectra. The different wavelengths and the differences in the spectra are depicted in ADDENDUM B. More specifically, ADDENDUM B depicts data indicating spectral lines for authenticating red/while table wines.

In ADDENDUM B, the wavelengths are listed in the left column, while the comments indicating whether there are any spectral differences are shown in the right column.

According to empirical data and research, the absorption spectra for tannic acids may be used to determine the characteristics of red wines. Also, the color differences in the blue-green spectrum may be used to determine the characteristics of red wines.

Typically, red wines absorb more in the green light spectrum, such as they transmit the color red. The particular shape the absorption curve in blue-green and green spectra may be useful in authenticating a specific red wine.

ADDENDUM B also shows labels for the interpolant samples that are spectral lines at regular intervals between the other lines. ADDENDUM B also shows the visible color differences. For example, for the wavelengths in the range from 450 to 697.766857, the differences are visible color differences.

2.4. Classification of Spectra

The wavelengths that are above 697.7668 are the infrared wavelengths. An ethanol/water crossing is at 895, while, for example, an ethanol absorption has a peak at 909.

It is useful to measure the relationship of these absorption spectra as they may indicate the relationship of water to alcohol in a particular wine sample.

From looking at the ethanol peak, and then, looking at the water absorption peak, one can get an idea of the amount of alcohol that is included in the sample. Then one may look at the tannic peak and get a sense of whether the wine sample was a red wine, and a sense of the qualitative taste notes of the wine. Another important observation is that tannic acid tends to increase over time in wine as the wine ages. Sampling these particular regions at a higher resolution in the Near UV and in the NIR may be useful in training a classifier, while sampling the blue through green regions broadly at lower resolution may aid in determining the visible transmitted color of red wine, and so may be useful in training a classifier.

2.5. Characteristic Line Spectra of Red and White Wines

Interpolants are the samples of oversampling around the spectral differences. They are fairly close together. For example, some may be ten nanometers apart, where some others may be just a nanometer or two nanometers apart. Since according to the present approach, a custom optical element to find these frequencies is created, the custom optical element can focus on the areas of the spectrum that are useful in distinguishing the different types of wines.

Typically, tannic acid is associated more with red wines and more with aged wines. Hence the information collected about wavelengths indicating the tannic acid may be used to write a classifier for the red and aged wines.

With regard to a tannic acid, a low level is a base of the tannic acid absorption peak. Then, the absorption level of the tannic acid has a little Gaussian peak, and then it drops down. Recognizing the tannic absorption Gaussian curve as a feature requires the device to sense the peak absorption and the base of the peak.

2.6. Software-Based Classifier for Wine Spectra

The training set collected above may be filtered for training in several steps.

First, the spectrum of the light source and the solute may be normalized or removed from the samples. For instance, for each data collection session for a specific item in the training set, a series of spectra of distilled water may be obtained. These spectra may be used to normalize the recorded spectra of the samples for that session. In one embodiment, a statistical median distilled water reference spectra is chosen as a reference by finding the median of the area under the spectral curve for each of the distilled water series. Next, a candidate spectrum of the series of spectra taken of an item in the training set may be chosen by finding that one which is most similar to the reference water spectra. Finally normalizing the spectrum of the item in the training set may be performed by scaling that spectrum's amplitude by the reciprocal amplitude of the reference distilled water spectra.

Secondly, the normalized spectrum for each item in the training set may be filtered for noise. In one implementation this may be performed by applying a Pseudo Gaussian IIR filter to the amplitude of the normalized spectrum. The window or size of the Gaussian filter may be determined by the resolution of the device. In this case the CCS200 has a resolution of about 2 nm and records a spectral line about every 0.5 nm, so the Gaussian window may be set to 4.

Finally, each spectrum may be compressed by the presence of high frequency features. That is, areas with smaller change in amplitude may be sampled sparsely, while areas with large changes in amplitude may be preserved.

The refined classifiers may be then used to detect the aging characteristics of wine based on the entire spectrum of specific light. For example, from the tannic acid information, one may determine not only whether the wine is red, but also whether the wine is properly aged.

Based on the training data, one can classify the red and white wine, and thus determine the characteristics that are different for the red and white wines. Once the spectra information is obtained, then the wine can be classified based on the obtained data. That information can be used as training data.

The training may be performed using a machine learning model to determine how well the machine learning model performs the wine classification. This may include determining whether the model is capable of finding the regions within the light spectra that indeed indicate, for example, a peak of a tannic acid or a peak of ethanol.

The model may be based on a tensorflow model. However, there are many other different models that may be configured to classify wine.

Once the classifiers are determined, the classifiers may be used to determine the corresponding characteristic line spectra, the corresponding wavelengths, and the corresponding frequencies. Based on that information, a geometry for the reading of red and white wine can be determined.

2.7. Spectral Response of CMOS Back-Illuminated CCD

Referring again to FIG. 3A, when the light is directed to the CMOS, back-illuminated CCD 340 lights up. CCD 340 responds to different spectra, and the response is read by a camera array.

A lens 330 is placed in front of CCD 340. The lens focuses on a plane of holographic optical element 308 that has the little dots (described before). Using the geometry as the one depicted in FIG. 1D, FIG. 2, and FIG. 3A, light 312 from light source 302 is directed to vessel 304, passes a wine sample stored in the vessel, bounces off the bottom wall of the vessel, and reflects as object beam 314 toward camera 300.

In the present approach, there are two maps. A first map maps the characteristic lines spectra to the CMOS back illuminated display, while a second map maps the display to a hologram. The first mapping is based on the little dots (shown and described in FIG. 4A), wherein each dot is a separable hologram that reflects a certain wavelength of light.

FIG. 4A depicts an example of a dot array 400. In the depicted example, the dot array is a twelve-across and eight-up array. This corresponds to the holographic optical element. The bay for the film has three regions in it. The three regions include a 402A region, a 402B region, and a 402C region. Region 402A captures the UV to near-visible range of light. Region 402B captures the visible range. Region 402C captures the infrared range. A point 402 is an individual holographic exposure or element.

An exposure angle of the light coming from a laser is usually determined based on, among other things, the desired frequency. An example of code used to determine the exposure angle is included in ADDENDUM B (described before).

In practice, the light angles include two angles, which include an object beam angle, and a reference beam angle. The angles are used in the holographic printer.

As described before, array 400 has twelve dots across and eight dots down. The dots are holographic pixels. An example of a pixel is dot 402. There is a separate exposure in the holographic printer with a certain angle of light so that a dot reflects just that one wavelength of light. Each one of the dots represents one spectral line that is of interest. The line is directly mapped and directly focused on the image plane of the CCD.

The present approach includes mapping of the characteristic line-spectra to the CMOS back-illuminating the CCD, which is the layout of the holographic optical element.

The holographic printer will print each of holographic elements that reflect just that spectral line.

Referring again to ADDENDUM B, the ADDENDUM B depicts spectral lines for authenticating red/white table wines. In ADDENDUM B, when considering lines across, there are shorter gaps going across than going up and down. Therefore, the list is read from left to right, and then moving to the next row, and then reading from left to right again.

There is usually some blurring between right and left holographic optical elements. The reason for that is because there is some interpolation between the data.

Based on the angle of the reference beam (the illuminating broad spectrum light, at 20 degrees rotated around the vertical axis), there is more information mixing or blurring between the columns than between the rows. It is desirable to have the ones that are next to each other in columns to be closer in their spectral frequency.

In ADDENDUM B, the first sets are in the first row of spectral differences. The spectral differences start from 221.428571 (first row in ADDENDUM B). The interpolants start at 226.428571. A low level of tanning acid absorption starts at 266. And so forth.

2.9. Mapping of the Characteristic Line Spectra to CMOS Back-Illuminated CCD The approach recited herein includes recording wavelength and its effect on the elimination sources. In the present approach, if for some reason an inexpensive light source is unavailable, then one or more separate life sources may be used to illuminate the plate. The light sources usually include a visible source and NIR source.

The light range used herein usually starts from a spectral line 221 all the way to a spectral line 972 (as shown in ADDENDUM B). A reflective hologram at two hundred spectral-line will also reflect at four hundred and at eight hundred. This is based on Bragg's law. It reflects the wavelength that is twice the fringe distance between the recorded wavelength that the hologram is recorded, and multiples of that. There might be an additional filter either in front of the light source or an additional filter in front of the holder to limit the waves to just UV visible light and IR.

2.10. Layout of the Holographic Optical Element (HOE)

Geometry for a holographic printer for fabricating a custom HOE for detecting the characteristic of spectra is rather similar to the one depicted in FIG. 1D and FIG. 2. Based on the geometry, the instructions for printing the HOE are generated.

Element 205 in FIG. 2 has an XY stage that moves in both the X direction and the Y direction. The plate of element 205 moves so that the beam hits the corresponding little dot, and so that the printer exposes sequentially each of the dots depicted in FIG. 4A. The plate is moved up and down so that it hits the right row in the array of dots depicted in FIG. 4A. The plate may be moved by a robotic apparatus that may have a motor and other elements allowing the precise movements of the plate.

The film is being exposed from left to right or in X direction, and then moved in the Y direction as the stage with the motor moves up and down. The stage positions the holographic plate for each of the dots that are depicted in FIG. 4A.

The plate may have different dimensions. For example, the plate may be two by three inches. Other implementations may include a plate that is other than two by three inches. The plate is rectangular because it has to fit the CCD aspect ratio of the camera. The preferred aspect ratio of the plate is two by three, or something in the neighborhood of fifty by seventy-five millimeters. The thickness of the plate is about four hundred millimeters.

2.11. Recording Wavelength and its Effect on Illumination Sources

In the next step, the parameters for exposing each of the little dots for each color are calculated. The calculations may depend on a specific angle. The reference wave represents the same angle as the light source wave depicted in FIG. 3A. The angles should be the same. The light is bouncing off, and then the hologram is reflecting toward the object direction or the object wave toward elements 340-330-300.

Referring again to FIG. 1D, the apparatus uses two degrees of freedom across the face of lens 130A that then focuses (122) it on one point 124 on the plate at element 102. It usually will land at that point because that point corresponds to the lens system.

It focuses from the point on the mirror of element 104A to the point on the plate of 102. Changing the angle in the X direction or the Y direction gives the control of the angle of the object beam as it falls on the plate.

2.12. Geometry for a Holographic Printer for Fabricating a Custom Hoe for Detecting the Characteristic Line Spectra of Red and White Wine In the present approach, a holographic printer allows controlling both the X and Y angles for both the object and the reference beams. This allows directing the light toward each holographic pixel or each little dot. The holographic printer can be moved according to the specific angle.

A Holographic Printer is fabricated to encode the specific spectral lines in a Holographic Optical Element (HOE). As described above, a reflection hologram is recorded by the interference of two beams of coherent (laser) light. The interference pattern imaged onto a photopolymer film causes the film to change the refractive index of the film based on this light pattern. This pattern may also be called a fringe pattern, and it may reflect light based on the spacing and orientation of this fringe pattern based on Bragg's Law.

The fringe orientation relative to the normal of the holographic plate, and the fringe spacing during construction may be calculated by calling the construct( ) function in Addendum A using the wavelength of the spectral line to encode for that point, and the playback angles for the light and CCD used in the target consumer apparatus.

The incident angles for the reference and object beams, determined by mirror angles 104A and 104B, may be calculated by calling reconstruct( ) with the wavelength of the laser light used in the printer, and using the fringe properties set by the construct( ) call.

The XY motion stage 205 moves the holographic film so that the next dot in the array may be encoded. The XY motion stage is an automatic means to move the holographic film in two dimensions.

The Array of points 102 is encoded on a film plane 124. The array of points is encoded one at a time because hologram construction in the film is most easily done with a single laser, and a single wavelength. Thus, the angle of the beam needs to be changed to produce the required fringe spacing using a fixed wavelength of laser light. The angle of interference is being changed between the two beams, and that causes a change in the fringe set.

2.13. Generation of Instructions for Printing a HOE

Instructions for printing a holographic optical element include the instructions for each of the wavelengths used to construct the HOE. More specifically, the instructions are for each of the wavelengths shown in the ADDENDUM B and the reference and object beams.

The information about the wavelengths and beams is represented in vector forms and based on the vectors, a code for constructing a hologram is generated. The code is executed and the generated output includes the hologram code that indicates the fringe spacing. Then, based on the fringe spacing and the laser wavelengths, the angles for the reference and object beams are determined.

2.14. Printing

The angles for the reference and object beams are used to determine the movements of a robot to move the robot to the right spot. Then a laser wavelength (e.g., ~420 nm, blue) is recorded based on the particular angles. Then, the shutter is turned on. Once the shutter is turned, the hologram is recorded. Then, the plate is moved (i.e., repositioned), and the process is repeated for the next dot, and then for the remaining dots.

2.15. Integration

Once the hologram data is printed, the data is integrated. This includes taking the holographic optical element that was created (shown in FIG. 2) and plugging it into a set up as shown in FIG. 3A.

2.16. Test

To test the content of wine, a sample of wine may be placed in a sample holder, and the holder may be placed in a container like container 304 in FIG. 3A. Then the light is turned on allowing a camera to record the colors received by the camera. Then the wine sample may be replaced by a sample of water and the test may be repeated to determine whether the recording is the same as in the initial setting.

Once that is done, the data obtained for each one of the dots received from the camera is used to compare with a classifier that was built using the full system. For example, the data from CCD 340 of camera 300 (shown in FIG. 3A) is ported into the classifier.

Sending the data to the classifier and testing its response for each wine in the test set validates the system as a whole. Further testing of the HOE within the device geometry may include testing wines that are not in the test set and are similar. This is to test that they are not authenticated, or depending on the training of the classifier, that they are properly classified in reference to the training set. Once the system is validated, the hologram can be mass-produced. Mass-produced copies of the HOE may be used to classify the wine on a global scale.

According to the approach disclosed herein, a little thin container 306 (a cuvette, shown in FIG. 3A) is used as a vessel for wine samples. The container may be placed in vessel 304. beneath container 306, a hologram can be placed in vessel 304. The HOE may be embedded in plastic, or can be adhered to the glass, or sealed so it can be washable.

Once the cuvette is filled with wine, the container may be dropped into a slot of vessel 304. Then, an operator may start the apparatus by, for example, pushing a button installed on vessel 304. Once the machine starts, the operator may observe the spectral response.

The testing of wine using the present apparatus includes taking a sample of wine, placing it in vessel 304, and observing the spectral response. The light stimulated by a laser and transmitted through the wine, causes the light to be transmitted through the wine sample, and the amplitude of the spectral lines recorded.

The amplitude and location of the spectral data is transmitted to the classifier. The classifier returns its output.

In one embodiment the output may be what the closest match to a wine in the training set might be, and if the wine is authentic.

In another embodiment the output may be what the tasting notes for the wine may be. In this embodiment, graded values of correlations to a set of structured qualitative tastes (such as sweetness, brightness, floral tastes, various fruit tastes, various spice tastes) may be sent to a generative speed AI to be read to a user.

The approach uses a similar technique to analyze the frequencies of the light that are reflected from an object. In this embodiment, broad spectrum light illuminates the material or product to be authenticated and is reflected through a lens and onto the HOE. The image of the HOE is then focused on a CCD and read.

2.17. Fabrication of Production Hoes

FIG. 3B is an example of copying a master hologram. According to the example depicted in FIG. 3B, a master hologram 3B100 is laminated to form a laminated hologram copy 3B102.

Laminated hologram copy 3B102 is then exposed to a light emitted from a light source 3B104. This results in generating an exposed copy 3B106.

Exposed copy 3B106 is delaminated. If the result is satisfactory, then the result is referred to as a delaminated copy 3B108. However, if the result is not satisfactory, then the lamination process, the exposure process, and the delamination process are repeated, as shown in FIG. 3B, until a satisfactory delaminated copy 3B108 is obtained.

Then, satisfactory delaminated copy 3B108 is bleached to obtain a replica hologram 3B110. The replica may be used in mass-production and on a global scale.

Additional information about fabrication of the production HOE is provided later.

2.18. Practical Applications

The approach described herein may be used to, for example, provide a set of high-end services to wine collectors, allowing them to learn more about the wine that they are collecting, and to determine whether the wine is authentic. The approach also allows the users to determine the kinds of wine that they like, to characterize the wines that they can recommend to others, and to determine the wines that they want to buy or collect. The services may be offered to and by both the individual wine collectors and specialized wine distributors and wine makers.

Another application of the approach presented herein is a wine authentication service. The service may be provided to the winemakers. Alternatively, the proof of a wine's authenticity may be embedded as a near-IR communications code under, for example, the label on the wine bottle. That code may be used as a form of authentication as it usually is difficult to duplicate.

2.19. Example Flow Chart

Figure 8:
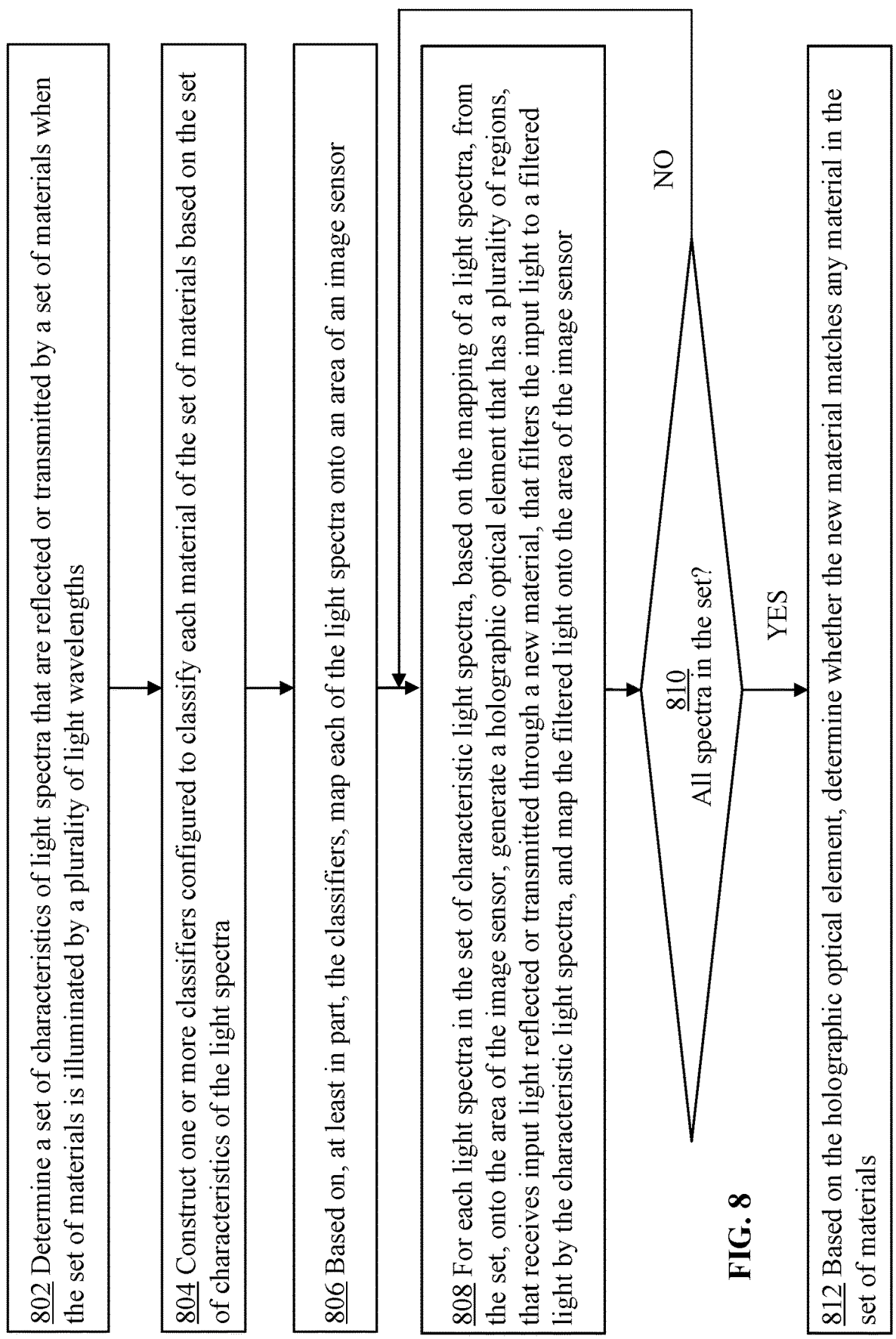
FIG. 8 is an example flow chart of a process according to one embodiment.

FIG. 8 is an example flow chart of a process according to one embodiment. In step 802, a spectrometer or similar apparatus is used to collect a set of characteristics of light spectra that are reflected or transmitted by a set of materials when the set of materials is illuminated by a plurality of light wavelengths.

In step 804, the set of spectra collected from the set of materials are used to train one or more classifiers. The classifiers are configured to classify each material of the set of materials based on the set of characteristics of the light spectra.

In step 806, based on, at least in part, the performance of the classifiers, an optimized set of light spectra are mapped onto an area of an image sensor.

In step 808, the apparatus in FIG. 1d generates a holographic optical element. The element is generated for each light spectra in the set of characteristic light spectra, and based on the mapping of a light spectra, from the set, onto the area of the image sensor. As described before, the holographic optical element has a plurality of regions. The holographic optical element is the element that receives input light reflected or transmitted through a new material, filters the input light to a filtered light by the characteristic light spectra, and maps the filtered light onto the area of the image sensor.

In step 810, the apparatus in FIG. 3a is used to check if the holographic optical element has been generated for all spectra in the set of characteristic light spectra. If it has, then the apparatus testing proceeds to perform step 812. Otherwise, the apparatus proceeds to step 812.

In step 812, the apparatus in FIG. 3a is used to determine, based on the holographic optical element, when its output data is transmitted to a paired classifier, whether the new material matches any material in the set of material.

In some embodiments, the apparatus in FIG. 3a also determines, using the holographic optical element, when its output data is transmitted to a paired classifier, whether the new material matches any material in a set of similar materials that are similar to the set of materials.

The holographic optical element may be used to generate a copy of the holographic optical element.

Furthermore, the apparatus in FIG. 3a may authenticate the new material based on the determination, using the copy of the holographic optical element, when its output data is transmitted to a paired classifier, whether a match is found between the new material and the set of materials or the set of similar materials.

In some implementations, the holographic optical element is generated using a holography approach using reflected light in the Lipman-Bragg approach.

The input light transmitted through the new material to test penetrates the new material that is in a liquid form and that is contained within a space between two sheets of glass. Furthermore, the input light reflected from the new material is reflected off dots encoded in the holographic optical element; each dot is configured to filter a specific wavelength of light. Moreover, the input light is recorded by a camera through a lens system of the camera and then recorded onto a charge coupled element of a camera, or sensor array.

In some implementations, the camera is a CMOS charge coupled camera which has a range from an ultraviolet (UV) spectra into a near infrared (NI) spectra. The camera may have a light source that illuminates a light being within the range, and then reads reflection characteristics of the holographic optical element.

3.0. Example Smartphone-Based Implementation

3.1. Smartphone-Based Classifiers

In some implementations, the approach for authenticating and classifying products using hyper-spectral imaging is implemented using portable devices such as smartphones. In the smartphone-based approach, the geometry described above still applies; however, most of the processing is performed using the enhanced capabilities of the smartphone. The smartphone implementation is based on the same techniques that are used to make the holographic optical element described before, however the range of light used to classify a material or product is necessarily limited by the spectral range of the camera in the smartphone or portable device.

One of the benefits of a smartphone implementation is a significant cost reduction. To reduce the cost in the smartphone implementation, a smartphone is used as both the camera. light source, and as a processor to run a classifier. In some implementations, additional light sources may be used to improve the classification of the set of materials. In other implementations, other CCDs or sensors may be used to improve the classification of the set of materials.

Furthermore, in a smartphone implementation, since it will operate in the visible range of the smartphone camera, additional spectral filtering may not be used.

Figure 5:
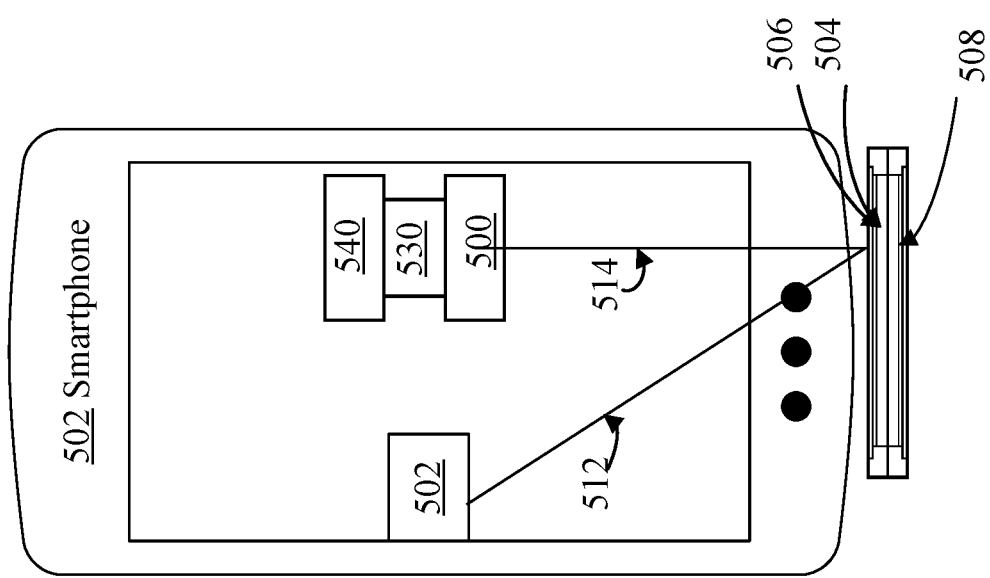
FIG. 5 is an example of an approach implemented in a smartphone.

FIG. 5 is an example of an approach implemented in a smartphone. The smartphone implementation shown in FIG. 5 is similar to that depicted in FIG. 3A with the exception that the smartphone setup is used to replace the other light source. More specifically, light source 302 (of FIG. 3A) is replaced by a torch or a light 502 located on the back of a smartphone 502, as shown in FIG. 5. Furthermore, camera 300 (and its elements 330 and 340 of FIG. 3A) are replaced by a camera 500 and a lens 530 and a CCD 540, as shown in FIG. 5.

Holographic optical element 508 may be used to filter the light that is transmitted through liquid 506. The holographic optical element and all corresponding dots are at the back of vessel 504.

One of the smartphone setup limitations is that only visible light is being viewed.

Once a copy of a holographic optical element is made, the copy could be used as an actual master. Then one needs to integrate it with the physical setup of the hyper spectral imaging device, as shown in FIG. 5 later. In FIG. 5, holographic optical element 508 may be used to filter the light that is transmitted through liquid 506. The holographic optical element and all corresponding dots are at the back of vessel 504.

As shown in FIG. 5, a holographic optical element is adhered to a sheet of transparent glass. It is usually a special glass that basically transmits at near UV visible through NIR, and it is adhered with an adhesive film that index-matches the surface of the hologram that is adhered to the glass with the emulsion side.

The choice of adhesive film is important because some adhesive films will change the thickness of the photopolymer, and, therefore, may cause a shift in wavelength. In some implementations, a very thin silicon film is used. Its index matches the surface of the hologram using the glass.

The glass is usually adhered to the holder. One pours a liquid into the holder and exposes the holder to the full spectrum light from the near UV visible and into the NIR. The light goes through the glass at the front. It goes through the liquid that is to be characterized, bounces off it, and goes through the glass and the backplane. The light then bounces off the hologram and then is transmitted to the camera 500 (as shown in FIG. 5).

The lens focuses on the plane of the hologram and directs the light onto the plane of CCD 540 (as shown in FIG. 5). This allows measuring the color of each dot.

The device needs to be calibrated by taking a picture with no substance in the container (i.e., when there is just air or water; the water would be best so that each dot in the hologram would be with no absorption).

One puts some liquid or material into a holder and records the difference between the calibrated case and the case with the substance that can be tested. This is typically done by analyzing the spectral lines at each one of the dots and determining how much of the light was absorbed at that spectral line. This is based on spectroscopy.

In a smartphone-based implementation, only the visible light is used, while the UV invisible and IR light are omitted. Since only the visible light is used, the classifier is trained for the visible light, and only the spectral lines corresponding to the visible light are classified. In this approach, since the spectral lines are limited to the visible light range, only the characteristics that are associated with the visible light spectrum are relied upon to authenticate and determine a fingerprint of the tested material, such as wine and the like.

One of the benefits of a smartphone implementation is its convenience. Since a smartphone is relatively small in size, the smartphone may easily fit into a phone holder. Further, it can be easy to carry and easy to position in the proper relationship to 504 shown in FIG. 5 (corresponding to 304, shown in FIG. 3A). It should be noted that element 504 remains mostly the same, except that the hologram now is reflecting. This is optimized for visible light.

Referring again to FIG. 5, in place of the light source, the smartphone implementation includes a camera 500, which has lens 530. The camera has an offset from an angle to light 502. Both the camera and the light are provided by the same smartphone. The relationship between the camera, and the light source and vessel 504 are set up as in FIG. 3A.

The main motivation for developing a smartphone implementation is reducing the cost of the apparatus for authenticating and classifying products using hyper-spectral imaging. This is achieved by replacing most of the expensive parts included in a setup depicted in, for example, with a smartphone, and perhaps a slip for a holder for vessel 504 (shown in FIG. 5).

3.2. Holographic Optical Elements for Smartphones

A holder in a smartphone implementation may be used to hold a vessel that can be filled with, for example, a fluid such as wine. The vessel may have a hologram in the back to allow measuring the characteristics of the wine or the authenticity of the wine. Light from the torch on the back of the smartphone may be used to illuminate the vessel. A fixture may hold the vessel at the proper reconstruction angle to the smartphone's torch and its camera. The light travels through the vessel and the liquid to be tested, is filtered and reflected by the HOE affixed to the back glass of the vessel. The reflected light travels once again through the liquid sample and is focused upon the CCD of the smartphone's camera by its lens. A camera inside the smartphone takes a picture of the light/colors reflected from the hologram (in the back of the vessel), and the software running on the smartphone performs the classification of the fluid based on the reflected light/colors.

A smartphone-based implementation uses a specific hologram. Such a hologram uses a visible light spectrum, not UV or IR spectra. Therefore, the hologram used in the smartphone-based implementation is configured to generate the classifiers for the visible light, not UV or IR spectra.

Geometry for a smartphone-based implementation usually works as it would have for other implementations. That means that reflected light 514 is captured by camera 500, directed to lens 530 and then to CCD 540. Based on the smartphone camera's lens and the holographic optical element, the reflected light is mapped onto the CCD. The phone camera would capture only the visible portion of the spectra for the classifier, and only the visible light would be captured in the phone CCD.

In some implementations, a smartphone-based implementation relies on additional holographic pixels around each of the spectral lines so that the phone can distinguish the peaks. Depending on its response, the same kind of geometry may be used in the holographic printer.

In some implementations, an additional light source in the form of a UV emitting LED may illuminate the vessel from the side. This may cause the liquid sample to fluoresce. An additional visible spectrum from this fluorescence may be used to classify the liquid sample.

The instructions for printing the holographic optical element are also similar as in other approaches, with the exception that they pertain to the visible lines.

Once a holographic optical element is fabricated, it can be integrated in a vessel and the vessel can be attached via a holder to the smartphone.

Then the whole system is tested to prove that the classifier works with the phone, the fixture, the vessel, and the HOE/classifier pair when tested against the test set of material samples. In other words, to validate the level of accuracy that can be achieved with the device for that set of training materials.

3.3. Connection of an Additional Light Source

The angle of the light source in reference to the vessel and the HOE is not limited by the torch's physical location on the smartphone. A small set of relay mirrors may be placed within the fixture to change this angle.

An additional LED source may be added to the fixture to improve classification of some spectral lines.

3.4. Reflections from a Phone Cassette

The vessel, cassette or cuvette that holds the liquid sample may be composed of glass that is coated to suppress reflections from the surface of the glass.

3.5. Example Flow Chart

Figure 10:
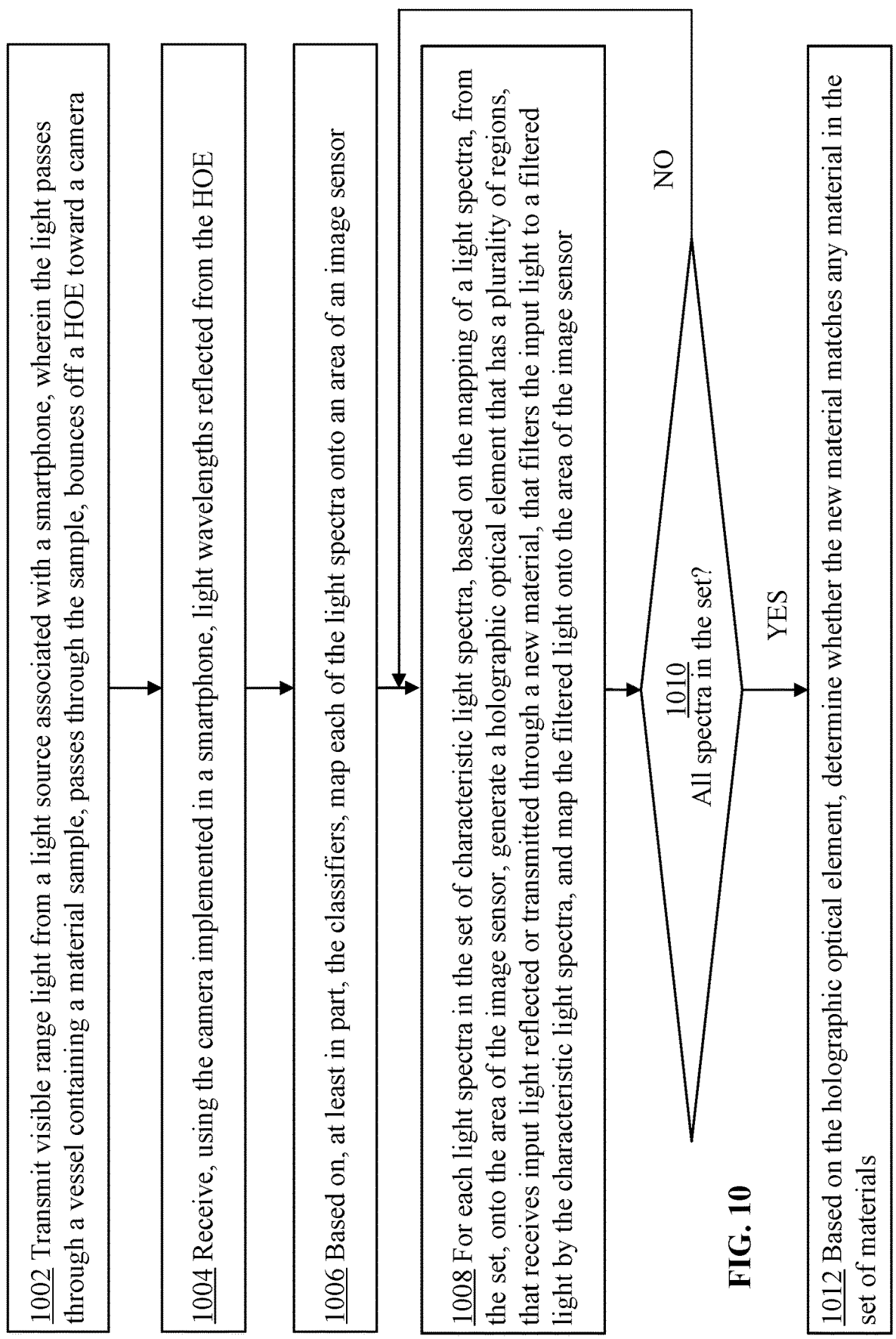
FIG. 10 is an example flow chart of a smartphone-based process according to one embodiment.

FIG. 10 is an example flow chart of a smartphone-based process according to one embodiment. The steps of FIG. 10 are described in reference to FIG. 5, which shows that camera 500 points straight on holographic film 508 that is placed at the bottom of a vessel 504.

In step 1002, a visible range light is transmitted from a light source toward a vessel containing a material sample such as a wine sample or the like. The light passes through the vessel containing the material sample, passes through the sample, and bounces off (from a HOE located at the bottom of the vessel) toward a camera implemented in the smartphone.

Referring to FIG. 5, light 512, from a source 502, passes through the liquid (stored in vessel 504), and then is transmitted toward camera 500. Light 514 (representing an object beam) is illuminating from holographic film 508 and is sent through vessel 504 containing a liquid 506 (e.g., a wine sample that is to be characterized).

In some implementations, light 512 is coming in at twenty degrees (or less). The light is reflecting from the holographic optical elements. The angle, however, may be different in other implementations. Holographic optical element 508 may be used to filter the light that is transmitted through liquid 506.

The vessel includes, for example, two sheets of glass that transmit visible range light 512 from a light source 502.

Referring again to FIG. 10, in step 1004, the camera implemented in the smartphone receives the light that bounced off the HOE. As described in FIG. 5, light 512 is sent from light source 502 through the glass of vessel 504, through the liquid that is contained within that space between the two sheets of glass. The light reflects off the dots of holographic optical element 508, each one configured to filter a specific wavelength of light. Finally, the light, now as light 514, is recorded by camera 500 through lens system 530, and then recorded onto a CCD at 540.

4. Example Approach for a Micro Hyperspectral Imaging

The general approach to hyper-spectral imaging may also be applied to a rather simpler smaller device.

As in the examples above, a set of materials may be identified for classification. The materials may be classified based on detection of the materials' presence. Furthermore, they may be classified for authentication of their molecular structure through their absorbed light spectra. Moreover, they may be classified for the light emitted when exposed to specific wavelengths of UV light.

As in the examples above, spectrum data may be collected from each material in the set of materials using a spectrometer, or several spectrographic instruments. These spectra are representative of the wavelengths of light to be detected and classified by the micro-hyper-spectral imaging device.

4.1. Classifiers for Micro Hyperspectral Imaging

As described in Section 1.4, Classifying a Set of Materials, data may be filtered, culled, and classified. Further, the specific spectral lines required for classification may be determined.

Figure 4F:
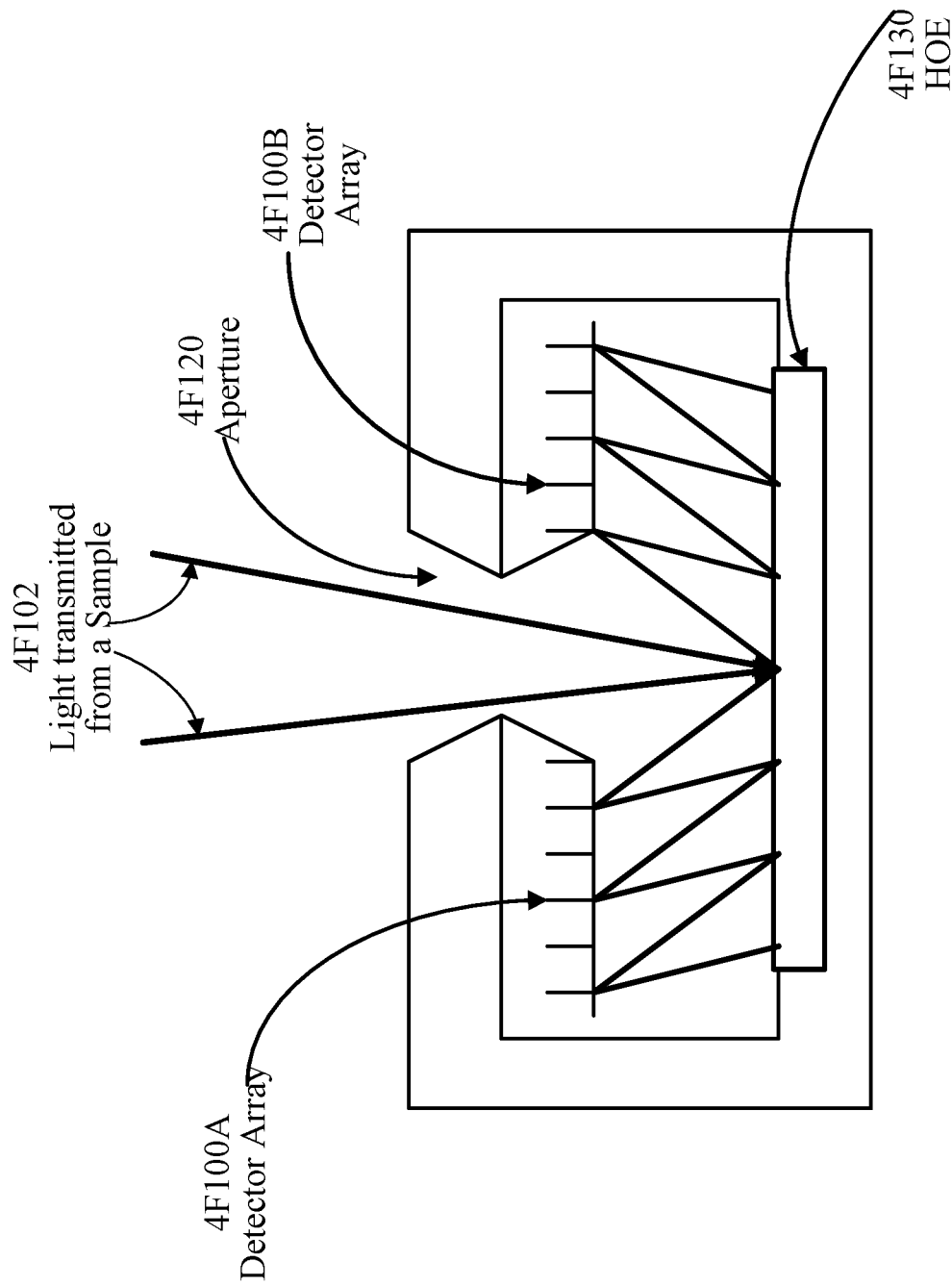
FIG. 4F is an example of micro hyperspectral imaging.

In some implementations, a holographic printer may be constructed as described above. FIG. 4F is an example of micro hyperspectral imaging. Referring to FIG. 4F, the main difference between these implementations and the previously described implementations is that these implementations are designed to produce an HOE 4F130 that is somewhat smaller. In one embodiment, the HOE measures 5 millimeters by 5 millimeters, and each holographic pixel is 0.4 mm in diameter. An array of 10×10 holographic pixels may encode 100 spectral lines of light 4F102 transmitted from a sample via an aperture 4F120.

4.2. Bragg Elements for Micro Hyperspectral Imaging

The holographic pixels are encoded with a curvature to the wavefront, so that they self-focus onto a near-field detector array 41F100A, 4F100B when placed in their reconstruction geometry. This allows HOE 4F130 to be applied or laminated to a custom detector, where the geometry for its reconstruction is implemented in the custom detector to form a self-contained micro hyper spectral imaging device.

The components for construction of the micro-hyper-spectral-imaging device include the HOE, and a fixture in silicon (or other material from which the detector is constructed) to hold the HOE. This fixture is held so the HOE may receive light 4F102 transmitted from a sample through aperture 4F102 constructed, for example, in silicon, and focus it onto detector arrays (4F100A, 4F100B) constructed from layers of, for example, doped silicon.

4.3. Micro Hyperspectral Imaging Applications

In some implementations, a micro hyper spectral imaging device may be designed and paired with a classifier designed to detect specific spectral lines which harmful compounds emit as fluorescent light when illuminated with specific wavelengths of ultraviolet light.

In some other implementations, a micro-hyper-spectral-imaging device may be designed and paired with a classifier designed to detect visible and near infrared radiation from the surface of costly articles made of leather when illuminated by cyan-enhanced white LEDs and near infrared LEDs.

In some implementations, a micro hyper spectral imaging device may be designed and paired with a classifier designed to detect specific spectral lines that aromatic elements emit as fluorescent light when illuminated with specific wavelengths of ultraviolet light.

5.0. Example Approach Based on Hyperspectral Imaging

Raman spectroscopy is a spectroscopic technique typically used to determine vibrational modes of molecules. It may also be used to determine rotational and other low-frequency modes of systems. Raman spectroscopy is commonly used in chemistry to provide a structural fingerprint by which molecules can be identified.

Raman spectroscopy relies upon inelastic scattering of photons, also referred to as Raman scattering. A source of monochromatic light, is usually sent from a laser in the visible, near infrared, or near ultraviolet range. In some implementations, X-rays can also be used.

The laser light interacts with molecular vibrations, phonons or other excitations in the system, and that results in the energy of the laser photons being shifted up or down. The shift in energy gives information about the vibrational modes in the system.

Infrared spectroscopy typically yields similar yet complementary information. Typically, a sample is illuminated with a laser beam. Electromagnetic radiation from the illuminated spot is collected with a lens and sent through a monochromator. Elastic scattered radiation at the wavelength corresponding to the laser line (also referred to as Rayleigh scattering) is filtered out by either a notch filter, edge pass filter, or a band pass filter, while the rest of the collected light is dispersed onto a detector.

Spontaneous Raman scattering is typically quite weak. Therefore, for many years the main difficulty in collecting Raman spectra was separating the weak inelastically scattered light from the intense Rayleigh scattered laser light (also referred to as "laser rejection").

Historically, Raman spectrometers used holographic gratings and multiple dispersion stages to achieve a high degree of laser rejection. In the past, photomultipliers were the detectors of choice for dispersive Raman setups, which resulted in long acquisition times.

However, modern instrumentation almost universally employs notch or edge filters for laser rejection. Dispersive single-stage spectrographs (also referred to as axial transmissive (AT) monochromators or Czerny-Turner (CT) monochromators) are usually paired with CCD detectors.

The name "Raman spectroscopy" typically refers to vibrational Raman using laser wavelengths which are not absorbed by the sample. There are many other types of Raman spectroscopy including surface-enhanced Raman, resonance Raman, tip-enhanced Raman, polarized Raman, stimulated Raman, transmission Raman, spatially-offset Raman, and hyper Raman.

The magnitude of the Raman effect correlates to polarizability of the electrons in a molecule. It is a form of inelastic light scattering, where a photon excites the sample. The excitation puts the molecule into a virtual energy state for a short time before the photon is emitted.

Inelastic scattering means that the energy of the emitted photon is of either lower or higher energy than the incident photon. After the scattering event, the sample is in a different rotational or vibrational state.

For the total energy of the system to remain constant after the molecule moves to a new rovibronic (rotational-vibrational-electronic) state, the scattered photon shifts to a different energy, and therefore a different frequency. This energy difference is equal to that between the initial and final rovibronic states of the molecule. If the final state is higher in energy than the initial state, the scattered photon will be shifted to a lower frequency (i.e., lower energy) so that the total energy remains the same. This shift in frequency is called a Stokes shift, or downshift. If the final state is lower in energy, the scattered photon will be shifted to a higher frequency, which is called an anti-Stokes shift or upshift.

Figure 6:
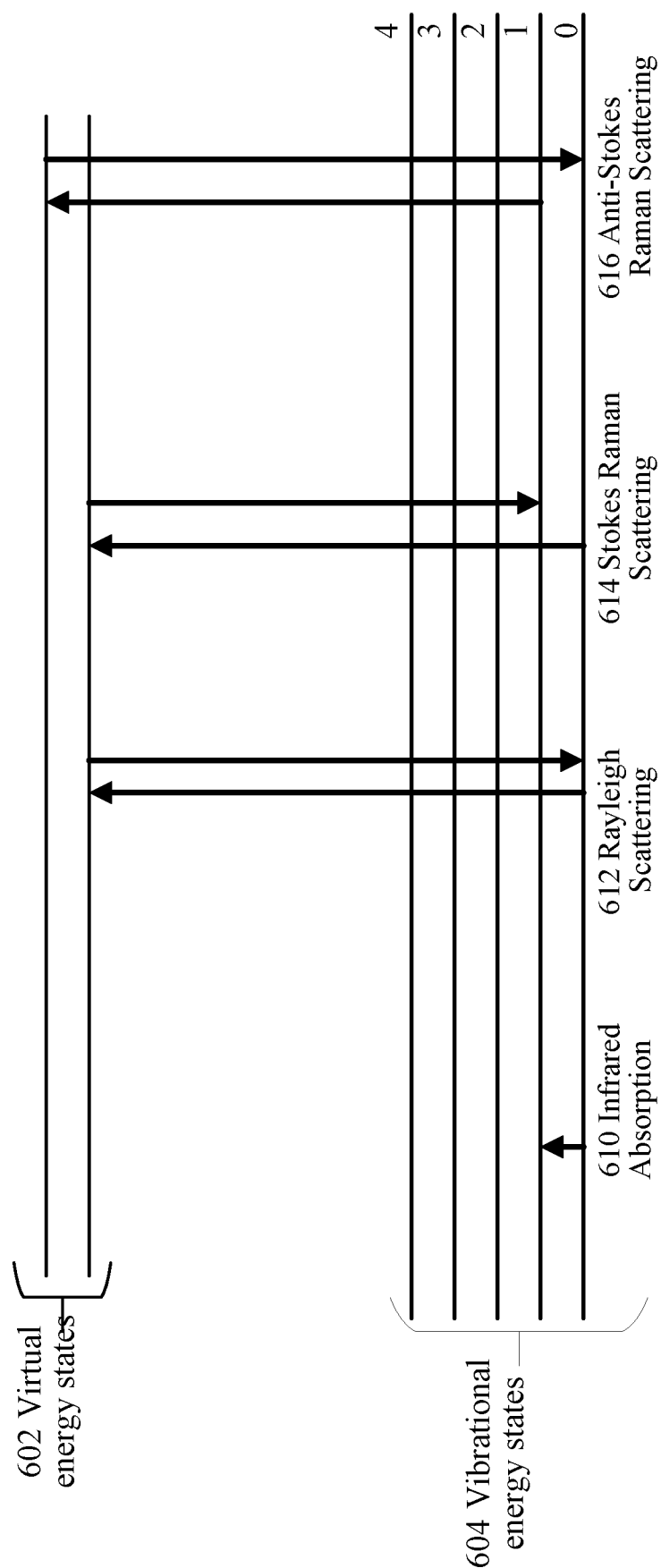
FIG. 6 is an example of spontaneous Raman spectroscopy.

FIG. 6 is an example of spontaneous Raman spectroscopy. The depicted example shows virtual energy states 602 and vibrational energy states 604. A infrared absorption 610 mainly shows the absorption of level 0-1 vibrational energy states; a Rayleigh scattering 612 pertains to level 0 and some virtual energy states 602; Stokes Raman scattering 614 involves levels 0-12 and some virtual energy states 602, and anti-stokes Rama scattering 616 involves levels 0-1 and some virtual energy states 602. Other examples (not shown) may illustrate other types of spectroscopy.

For a molecule to exhibit a Raman effect, there must be a change in its electric dipole-electric dipole polarizability with respect to the vibrational coordinate corresponding to the rovibronic state. The intensity of the Raman scattering is proportional to this polarizability change. Therefore, the Raman spectrum (scattering intensity as a function of the frequency shifts) depends on the rovibronic states of the molecule.

The Raman effect is based on the interaction between the electron cloud of a sample and the external electric field of the monochromatic light, which can create an induced dipole moment within the molecule based on its polarizability. Because the laser light does not excite the molecule there can be no real transition between energy levels.

The Raman effect should not be confused with emission (fluorescence or phosphorescence), where a molecule in an excited electronic state emits a photon and returns to the ground electronic state, in many cases to a vibrationally excited state on the ground electronic state potential energy surface. Raman scattering also contrasts with infrared (IR) absorption, where the energy of the absorbed photon matches the difference in energy between the initial and final rovibronic states. The dependence of Raman on the electric dipole-electric dipole polarizability derivative also differs from IR spectroscopy, which depends on the electric dipole moment derivative, the atomic polar tensor (APT). This contrasting feature allows rovibronic transitions that might not be active in IR to be analyzed using Raman spectroscopy, as exemplified by the rule of mutual exclusion in centrosymmetric molecules. Transitions which have large Raman intensities often have weak IR intensities and vice versa. If a bond is strongly polarized, then a small change in its length such as that which occurs during a vibration has only a small resultant effect on polarization.

5.1. Implementation Over View

In comparison with the approaches disclosed in Sections 2-3, a Spontaneous Raman scattered hyperspectral imaging-based approach uses a different geometry and a different type of spectroscopy than the previous approaches. The first two inventions (described in Sections 2-3) relied on transmitting light through the sample, determining the amount of the light that has been absorbed by the sample, and then using the holographic optical element to look at the specific spectral lines of absorption. In contrast, the spontaneous Ramen-based approach uses a different physical principle.

In the Raman-scattering-based approach, a high intensity laser light is used, including the light wavelength of 1,064 nm, which is NIR light. That wavelength is chosen so that there is a point at which water absorbs a lot of infrared radiation, which is somewhere at the 900 nm or so.

In this approach, the fluorescence of some of the materials, such as tannic acids and other acids, is being measured.

5.2. Example of Raman Scattering Hyperspectral Imaging

Figure 7:
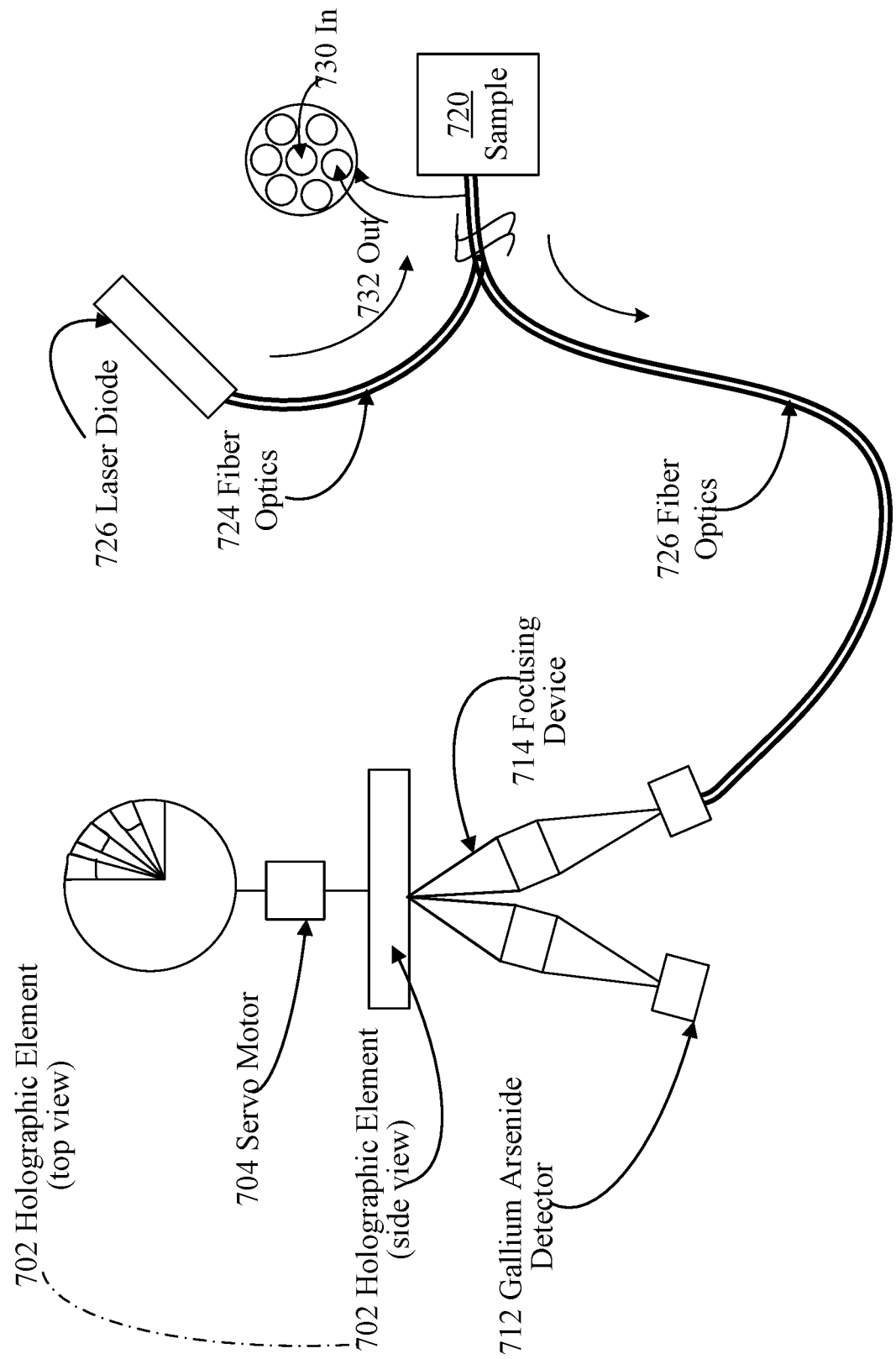
FIG. 7 is an example of Raman scattering hyperspectral imaging.

FIG. 7 is an example of Raman scattering hyperspectral imaging. The example setup is used to obtain, among other things, a clearer reading of the composition of a sample 720 of the particular red wine. The physical property (sample 720) is illuminated by the laser light coming from, for example, a laser diode 726 via, for example, a fiber optics cable 724. The light stimulates the molecules in the sample, and then they vibrate and then give off the reflection. The reflected Spectra that is an offset from the stimulation of the laser light.

The physical property reflection effect is called Raman scattering generated by stimulated emissions. It is a particular kind of molecular fingerprint of the molecular structure that captures the molecules vibrations and that can be measured by the reflected light. In some ways, this approach produces a more accurate molecular fingerprint of the material than an absorption spectra (described in Sections 2-3). Therefore, there are some advantages for using Raman scattering to identify molecules or to authenticate.

As shown in FIG. 7, instead of using a diffraction grating or a prism to generate a spectrum, the Raman-based approach uses a holographic optical element 702 to look at specific spectral lines in the near infrared. The holographic element may be, for example, a circular plate that is rotated using a servo motor 704.

A Raman spectrometer may operate at the frequency of 1,064 nm, and in other approaches, a Raman spectrometer may be used to observe the spectrum of the different materials that are being measured to find, for example, the specific spectral lines that can be used to help classify that material. A Raman spectrometer operating with the 1,064 laser excitation wavelength may be expensive due to the cost of the detector array, so the systems utilizing the Raman spectrometer may not be affordable to some.

According to the present approach, Gallium arsenide detectors 712 (described in detail later) are used to find certain wavelengths and to classify certain materials encoded in the holographic element. The differences between the approaches described in Sections 2-3 and the approach described herein is that detectors 712 are usually gallium or arsenate photo detectors, which detect the near and mid infrared waves and then the silicon CCD (described before).

Since the detectors are generally pretty expensive, the approach described in this section utilize the method for detecting only 1 point at the time, not an array. Referring again to FIG. 7, motor 704 rotates holographic element 702, which may be a disc. The motor is positioned at the center of the holographic element and causes turning the disc so that the light is sequentially bounced off of each spectral line encoded in the holographic element over time.

In turn, the holographic element reflects the incoming light and then focuses it on to the Gallium arsenic detector. The path of the light starts in laser diode 726, goes through a fiber optic cable 724, which is then interleaved with another fiber optic, and the end of the optic has the input light fiber inset as shown in 730 and out 732.

Then the light goes back out along fiber optics cable 726, and is focused by a lens or lens system.

The focused light is then sent, via a lens, onto holographic element 702. Then, it is reflected, and focused back to gallium arsenide detector 712. That allows looking at the scattering the Roman scattering from sample 720.

Because the laser light is transmitted through the fiber optics and bounces off the sample, it stimulates the molecules of the sample, which then bounce back and are detected via the detector 712.

Using a single detector in conjunction with a holographic optical element that has specifically encoded lines in it for a specific classification of a set of materials is one of the novel elements of this approach. Another novel element is the usage of selective sampling using the Ramen scattering technique, where the laser amplitude, the filtering of spectra by a holographic element, and the amplified sensitivity of the detector, may be tuned for a specific spectral line.

Sample 720 may be a glass vial with flat sides that has fused quartz as the material, so that it can transmit the infrared light properly.

The light goes through the fused quartz, which is transparent to most NIR spectral lines, and then it stimulates the molecules of the material. The molecules vibrate and give off the spectral lines that are then read and identified.

The thickness of the liquid put in a vial matters to a certain extent, although Raman scattering effect mostly depends on the molecule's interaction within the sample. Hence, even the sample may be relatively small, just enough to reflect the light well.

Then, a computer reads the output from Gallium Arsenide detector 712. This may include a conversion of the analog output signal to the digital data/output.

The digital output is read and recorded for each of the spectral lines of the holographic optical element. That information is fed into a classifier or classifiers.

In this approach, the types of light that might be used include UV, visible NIR and so forth. A Raman scattering spectrometer may be used to determine the light lines that are needed to identify the characteristics of wines.

A holographic optical element is used to detect those particular lines in the infrared light reflected from the sample. For example, some of the lines are specific to ethanol, some other lines are specific to methanol, others are specific to tannic acid, others are specific to gallic acid, and so forth.

The Tannic acid Raman reflectance spectral line (in this case a Raman number) may be more pronounced for red wine than white wine. Additionally, the spectral lines indicating Gallic Acid, and other byproducts of the grape skin and wood aging cask will be different.

Software implemented in this setup may execute a software application configured to, for example, read the reflected spectral lines for each of the holographic optical element lines, and determine the wine characteristics based on the pattern of Raman reflectance. Examples of absorption-based characteristics were described earlier.

5.3. Example Flow Chart

Figure 11:
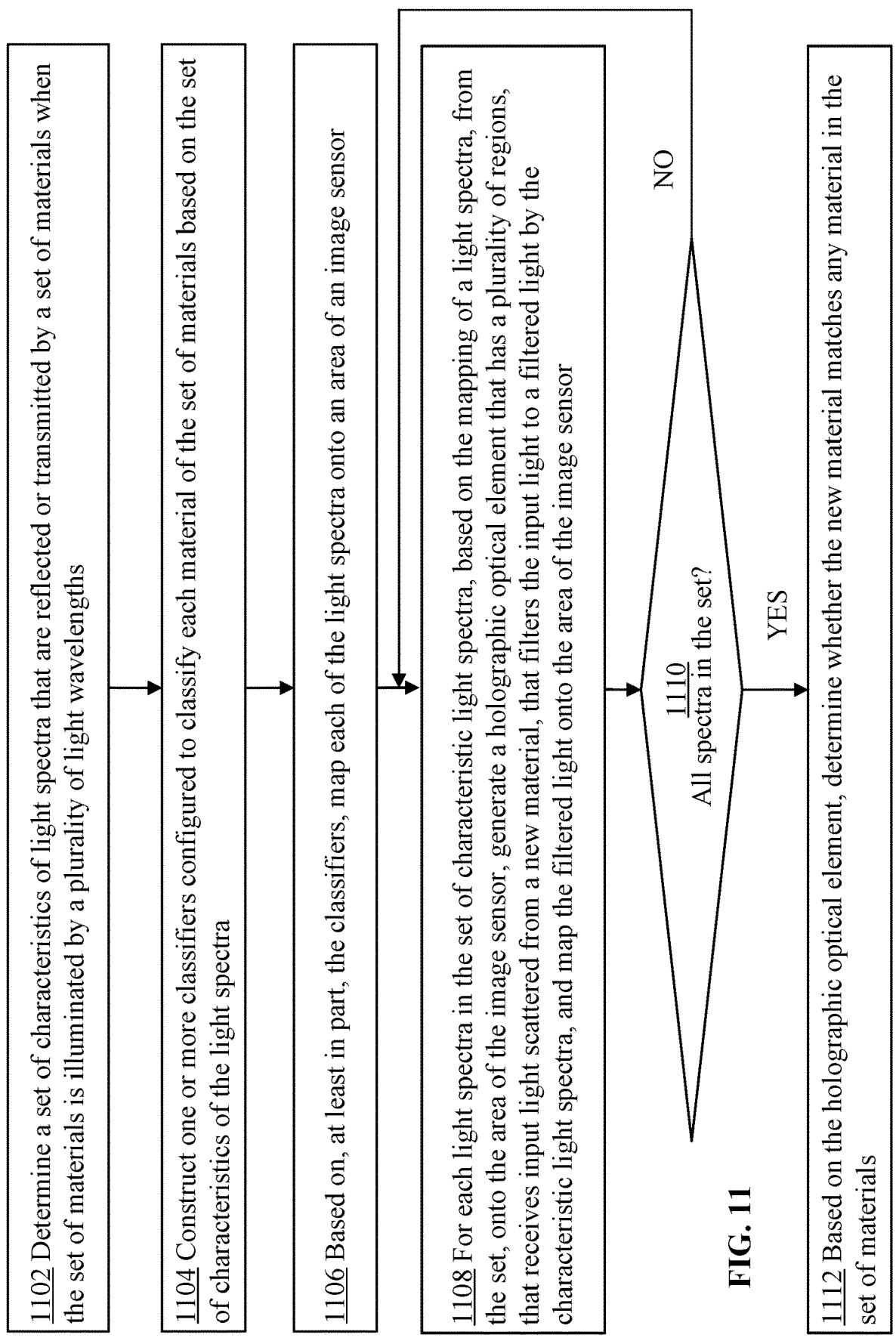
FIG. 11 is an example flow chart of a spontaneous scattering-based process according to one embodiment.

FIG. 11 is an example flow chart of a spontaneous scattering-based process according to one embodiment.

In step 1102, an apparatus determines a set of characteristics of light spectra that are reflected or transmitted by a set of materials when the set of materials is illuminated by a plurality of light wavelengths. The geometry for collecting that information is depicted in, for example, FIG. 1D and FIG. 2.

In step 1104, the apparatus constructs one or more classifiers configured to classify each material of the set of materials based on the set of characteristics of the light spectra.

In step 1106, the apparatus maps, based on, at least in part, the classifiers, each of the light spectra onto an area of an image sensor.

In step 1108, the apparatus generates a holographic optical element. The element is generated for each light spectra in the set of characteristic light spectra, and based on the mapping of a light spectra, from the set, onto the area of the image sensor. As described before, the holographic optical element has a plurality of regions. The holographic optical element is the element that receives input light scattered from a new material, filters the input light to a filtered light by the characteristic light spectra, and maps the filtered light onto the area of the image sensor.

In step 1110, the apparatus checks if the holographic optical element has been generated for all spectra in the set of characteristic light spectra. If it has, then the apparatus proceeds to perform step 1112. Otherwise, the apparatus proceeds to step 1112.

In step 1112, the apparatus determines, based on the holographic optical element, whether the new material matches any material in the set of material.

In some embodiments, the apparatus also determines, using the holographic optical element, whether the new material matches any material in a set of similar materials that are similar to the set of materials.

The apparatus may also generate a copy of the holographic optical element by copying the holographic optical element onto the copy of the holographic optical element.

Furthermore, the apparatus may authenticate the new material based on the determination, using the copy of the holographic optical element, whether a match is found between the new material and the set of materials or the set of similar materials.

6.0. Implementations Mechanisms

Although the flow diagrams of the present application depict a particular set of steps in a particular order, other implementations may use fewer or more steps, in the same or different order, than those depicted in the figures.

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 12:
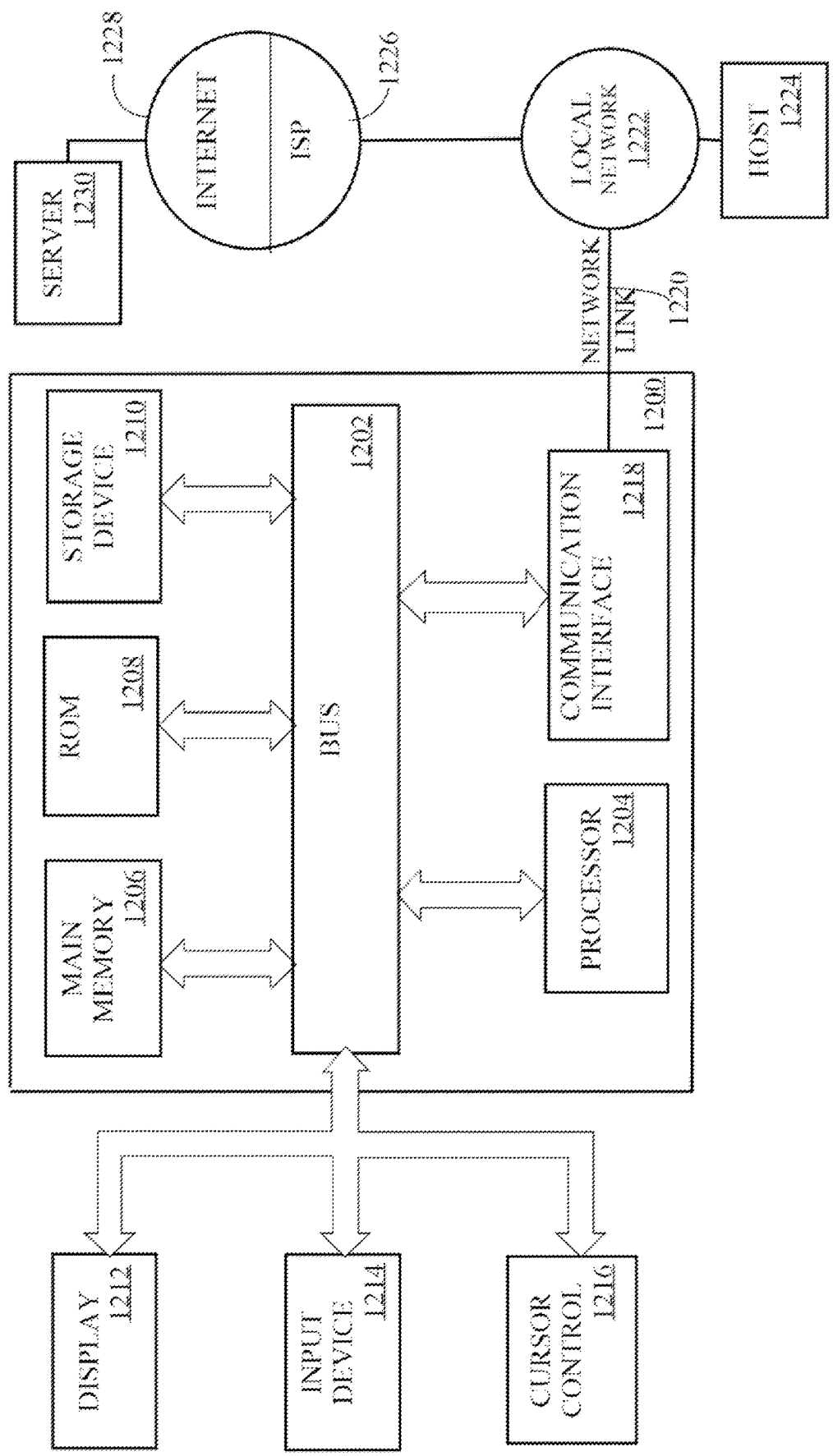
FIG. 12 is a block diagram depicting a computer system upon which some embodiments may be implemented.

FIG. 12 is a block diagram depicting a computer system 1200 upon which some embodiments may be implemented. Computer system 1200 includes a bus 1202 or other communication mechanism for communicating information, and a processor 1204 coupled with bus 1202 for processing information. Computer system 1200 also includes a main memory 1206, such as a random-access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Computer system 1200 further includes a read only memory (ROM) 1208 or other static storage device coupled to bus 1202 for storing static information and instructions for processor 1204. A storage device 1210, such as a magnetic disk or optical disk, is provided and coupled to bus 1202 for storing information and instructions.

Computer system 1200 may be coupled via bus 1202 to a display 1212, such as a cathode ray tube (CRT), for displaying information to a computer user. Although bus 1202 is illustrated as a single bus, bus 1202 may comprise one or more buses. For example, bus 1202 may include without limitation a control bus by which processor 1204 controls other devices within computer system 1200, an address bus by which processor 1204 specifies memory locations of instructions for execution, or any other type of bus for transferring data or signals between components of computer system 1200.

An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input-device typically has two degrees of freedom in two axes, a first axis (e.g., x) and a second axis (e.g., y), that allows the device to specify positions in a plane.

Computer system 1200 may implement the techniques described herein using customized hard-wired logic, one or more ASICs or FPGAs, firmware and/or program logic or computer software which, in combination with the computer system, causes or programs computer system 1200 to be a special-purpose machine. According to one embodiment, those techniques are performed by computer system 1200 in response to processor 1204 executing one or more sequences of one or more instructions contained in main memory 1206. Such instructions may be read into main memory 1206 from another computer-readable medium, such as storage device 1210. Execution of the sequences of instructions contained in main memory 1206 causes processor 1204 to perform the process steps described herein. In alternative embodiments, hard-wired circuitry may be used in place of or in combination with software instructions to implement the embodiments. Thus, embodiments are not limited to any specific combination of hardware circuitry and software.

The term "computer-readable medium" as used herein refers to any medium that participates in providing data that causes a computer to operate in a specific manner. In an embodiment implemented using computer system 1200, various computer-readable media are involved, for example, in providing instructions to processor 1204 for execution. Such a medium may take many forms, including but not limited to, non-volatile media and volatile media. Non-volatile media includes, for example, optical or magnetic disks, such as storage device 1210. Volatile media includes dynamic memory, such as main memory 1206. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip, or memory cartridge, or any other medium from which a computer can read.

Various forms of computer-readable media may be involved in carrying one or more sequences of one or more instructions to processor 1204 for execution. For example, the instructions may initially be carried on a magnetic disk of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1212 that is connected to a local network 1222. For example, communication interface 1218 may be an integrated service digital network (ISDN) card or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic, or optical signals that carry digital data streams representing various types of information.

Network link 1212 typically provides data communication through one or more networks to other data devices. For example, network link 1212 may provide a connection through local network 1222 to a host computer 1224 or to data equipment operated by an Internet Service Provider (ISP) 1226. ISP 1226 in turn provides data communication services through the world-wide packet data communication network now commonly referred to as the "Internet" 1228. Local network 1222 and Internet 1228 both use electrical, electromagnetic, or optical signals that carry digital data streams.

Computer system 1200 can send messages and receive data, including program code, through the network(s), network link 1212 and communication interface 1218. In the Internet example, a server 1230 might transmit a requested code for an application program through Internet 1228, ISP 1226, local network 1222 and communication interface 1218. The received code may be executed by processor 1204 as it is received, and/or stored in storage device 1210, or other non-volatile storage for later execution.

In the foregoing specification, embodiments have been described with reference to numerous specific details that may vary from implementation to implementation. Thus, the sole and exclusive indicator of what is, and is intended by the applicants to be, the approach is the set of claims that issue from this application, in the specific form in which such claims issue, including any subsequent correction. Hence, no limitation, element, property, feature, advantage, or attribute that is not expressly recited in a claim should limit the scope of such claim in any way. The specification and drawings are, accordingly, to be regarded in an illustrative rather than a restrictive sense.

7.0. Addendum A

---

C++ Implementation for calculating the geometry needed to encode a holographic pixel in one wavelength for reconstruction in another using Bragg's Law.

```
#include "..\Common\math\vector3f_sse.h"
#include "..\Common\math\quat3f_sse.h"
namespace yutils
{
    /*
    * Structure to hold a single holographic pixel
```

```
 * Updates the wavelength of each sample.
 * @param The xcitation wavelength
 */
struct HoloPix
{
    embree::Vector3f fringeAxis;                /* rotation axis of the fringe plane */
    embree::Vector3f fringeNormal; /* normal of the fringe plane */
    float fringeTheta;                          /* angle of the fringe plane about the fringeAxis*/
    float fringeSpace;                          /* spacing between fringes */
    float constructWave;                        /* the construction wavelength */
    float reConstructWave;z                     /* the reconstruction wavelength */
    /*
     * Constructor
     */
    HoloPix( ) {
        fringeAxis = embree::Vector3f(0.0f, 0.0f, 2.0f);
        fringeNormal = fringeAxis;
        fringeTheta = 0.0f;
        fringeSpace = 0.0f;
        constructWave = 0.0f;
        reConstructWave = 0.0f;
    }
    /*
     * Copy operator
     */
    HoloPix(const HoloPix& a) {
        fringeAxis = a.fringeAxis;
        fringeNormal = a.fringeNormal;
        fringeTheta = a.fringeTheta;
        fringeSpace = a.fringeSpace;
        constructWave = a.constructWave;
        reConstructWave = a.reConstructWave;
    }
    /*
     * Constructs a holographic pixel from a reference wave
     * and an object wave.
     * @param The construction wavelength
     * @param The normal for the incoming reference wave.
     * @param The normal for the incoming object wave.
     */
    void construct(float waveLength, embree::Vector3f& ref, embree::Vector3f& obj)
    {
        constructWave = waveLength;                         // store the constructing wave
        float fullCos = embree::dot(ref, obj);
        if (embree::abs(fullCos) < 0.99999f)                // within 0 to 280 degrees
        {
            fringeAxis = embree::cross(ref, obj);           // fringe axis of rotation in normal to the
                                                            // plane described by ref, obj
            fringeAxis = embree:normalize(fringeAxis); // normalize for conversion to quaternion
            fringeNormal = (ref + obj) * 0.5f;              // fringe normal is the halfway vector
                                                            // between ref, obj
            fringeNormal =
                embree::normalize(fringeNormal);            // normalize for dot product for cosine
            float fringeCos =
                embree::dot(obj, fringeNormal);             // fringe is rotated around axis by
                                                            // cosine between object and fringeNormal
            float fringeSin =
                embree::sqrt(1.0 − (fringeCos * fringeCos)); // sin calculated from unit length
            fringeTheta = asin(fringeSin);                  // fringeTheta is angle of the
                                                            // fringe plane about the fringeAxis
            fringeSpace = (waveLength / fringeSin) * 0.5f;  // use Bragg's law to calculate
                                                            // fringe spacing.
        }
        else if (fullCos < 0)                               // 180 degrees is minimum spacing
        {
            fringeSpace = waveLength * 0.5f;
            fringeAxis = embree::Vector3f(−ref.y, ref.x, ref.z);
            fringeNormal = ref;
            fringeTheta = embree::deg2rad(90.0f);
        }
        else                                                // 0 is no interference case
        {
            fringeSpace = HUGE_VALF;
            fringeTheta = 0.0f;
            fringeNormal = ref;
            fringeAxis = embree::Vector3f(−ref[1], ref[0], −ref[2]);
        }
    }
    /*
```

```
 * Finds the optimum ref and obj vectors for this holographic pixel
 * Given a specific wavelength
 * @param The reconstruction wavelength
 * @param The found normal for the incoming reference wave.
 * @param The found normal for the outgoing object wave.
 */
void optReconstruct(float waveLength, embree::Vector3f& ref, embree::Vector3f& obj)
{
    reConstructWave = waveLength;                              // store the reconstructing wave
    float sinTheta = waveLength / (fringeSpace * 2); // use Bragg's law to find the sine for
                                                               // the reconstruction angle
    if (sinTheta > 1)                                          // if we are off by an octave, go to
                                                               // the next whole wave for reconstruction
    {
        sinTheta = waveLength / (fringeSpace * 4);
    }
    float theta = embree::asin(sinTheta);                      // reconstruction angle offset from plane
                                                               // normal around fringeAxis
    embree::Quat3f quatTheta0 =
        embree::Quat3f::rotate(fringeAxis, theta);   // quatTheta0 is the rotation as a
                                                               // quaternion
    obj = embree::xfm Vector(quatTheta0, fringeNormal); // the object vector is the
                                                               // fringeNormal transformed by the
                                                               // reconstruction angle
    quatTheta0 = embree::Quat3f(quatThetaO.r,
        -quatTheta0.i, -quatTheta0.j, -quatTheta0.k); // quatTheta0 is now the negative
                                                               // rotation from plane normal around
                                                               // fringeAxis
    ref = embree::xfm Vector(quatTheta0, fringeNormal); // the object vector is the
                                                               // fringeNormal transformed by the
                                                               // negative reconstruction angle
}
/*
 * Calculates the wavenumber from the wavelength and the
 * excite wavelength
 * @param The excite wavelength
 * @param The spectral line to convert
 * @returns The wave number
 */
static float waveToWaveNumber(float excite, float wave)
{
    float waveNumber = (1.0f / excite) - (1.0f / wave);
    return(waveNumber);
}
/*
 * Calculates the wavelength from the wavenumber and the
 * excite wavelength
 * @param The excite wavelength
 * @param wavenumber to convert
 * @returns The spectral line
 */
static float waveNumberToWave(float excite, float waveNumber)
    // 1.0f / wave =(1.0f / excite) + waveNumber;
    float wave = 1.0f / (waveNumber + (1.0f / excite));
    return(wave);
}
};
};
```

8.0. Addendum B

Spectral Lines for Authenticating Red/White Table Wines

| Nm | Comment |
| --- | --- |
| 221.428571 | spectral differences |
| 226.428571 | Interpolant Sample |
| 231.428571 | Interpolant Sample |
| 236.428571 | Interpolant Sample |
| 241.428571 | spectral differences |
| 244.285714 | Interpolant Sample |
| 247.142857 | Interpolant Sample |
| 250 | Interpolant Sample |
| 252.857143 | spectral differences |
| 256.142857 | Interpolant Sample |
| 259.428571 | Interpolant Sample |
| 262.714286 | Interpolant Sample |
| 266 | Tannic Acid Absorption low |
| 266.642857 | Interpolant Sample |
| 267.285714 | Interpolant Sample |
| 267.928571 | Interpolant Sample |
| 268.571429 | spectral differences |
| 272.857143 | Interpolant Sample |
| 277.142857 | Interpolant Sample |
| 281.428571 | Interpolant Sample |
| 285.714286 | spectral differences |
| 288.214286 | Interpolant Sample |

-continued

Spectral Lines for Authenticating Red/White Table Wines

| Nm | Comment |
|---|---|
| 290.714286 | Interpolant Sample |
| 293.214286 | Interpolant Sample |
| 295.714286 | spectral differences |
| 297.535714 | Interpolant Sample |
| 299.357143 | Interpolant Sample |
| 301.178571 | Interpolant Sample |
| 303 | Tannic Acid Absorption peak |
| 308.678571 | Interpolant Sample |
| 314.357143 | Interpolant Sample |
| 320.035714 | Interpolant Sample |
| 325.714286 | spectral differences |
| 330.285714 | Interpolant Sample |
| 334.857143 | Interpolant Sample |
| 339.428571 | Interpolant Sample |
| 344 | Tannic Acid Absorption low |
| 348 | Interpolant Sample |
| 352 | Interpolant Sample |
| 356 | Interpolant Sample |
| 360 | spectral differences |
| 364.285714 | Interpolant Sample |
| 368.571429 | Interpolant Sample |
| 372.857143 | Interpolant Sample |
| 377.142857 | spectral differences |
| 450 | Visible Color Differences |
| 460 | Visible Color Differences |
| 470 | Visible Color Differences |
| 480 | Visible Color Differences |
| 490 | Visible Color Differences |
| 500 | Visible Color Differences |
| 510 | Visible Color Differences |
| 520 | Visible Color Differences |
| 530 | Visible Color Differences |
| 540 | Visible Color Differences |
| 550 | Visible Color Differences |
| 560 | Visible Color Differences |
| 570 | Visible Color Differences |
| 580 | Visible Color Differences |
| 590 | Visible Color Differences |
| 600 | Visible Color Differences |
| 610 | Visible Color Differences |
| 620 | Visible Color Differences |
| 630 | Visible Color Differences |
| 697.767857 | Interpolant Sample |
| 765.535714 | Interpolant Sample |
| 895 | Ethanol/Water crossing |
| 898.5 | Interpolant Sample |
| 902 | Interpolant Sample |
| 905.5 | Interpolant Sample |
| 909 | Ethanol Absorption peak |
| 912.5 | Interpolant Sample |
| 916 | Interpolant Sample |
| 919.5 | Interpolant Sample |
| 923 | Ethanol/Water crossing |
| 935.25 | Interpolant Sample |
| 947.5 | Interpolant Sample |
| 959.75 | Interpolant Sample |
| 972 | Water Absorption Peak |

9.0. Addendum C

TABLE 2

| | | | | | | | | | |
|---|---|---|---|---|---|---|---|---|---|
| 221.4 | 226.4 | 231.4 | 236.4 | 241.4 | 244.3 | 247.1 | 250.0 | 252.9 | 256.1 | 259.4 |
| 266.0 | 266.6 | 267.3 | 267.9 | 268.6 | 272.9 | 277.1 | 281.4 | 285.7 | 288.2 | 290.7 |
| 295.7 | 297.5 | 299.4 | 301.2 | 303.0 | 308.7 | 314.4 | 320.0 | 325.7 | 330.3 | 334.9 |
| 348.4 | 357.4 | 366.4 | 375.4 | 384.4 | 393.4 | 402.4 | 411.4 | 420.4 | 429.4 | 438.4 |
| 456.4 | 465.4 | 474.4 | 483.4 | 492.4 | 501.4 | 510.4 | 519.4 | 528.4 | 537.4 | 546.4 |
| 564.4 | 574.5 | 584.6 | 594.7 | 604.8 | 614.9 | 625.0 | 635.1 | 645.2 | 655.3 | 665.4 |
| 697.8 | 714.3 | 730.8 | 747.3 | 763.8 | 780.3 | 796.8 | 813.3 | 829.8 | 846.3 | 862.8 |
| 898.5 | 902.0 | 905.5 | 909.0 | 912.5 | 916.0 | 919.5 | 923.0 | 935.3 | 947.5 | 959.8 |

Placement of Spectral lines for authenticating red/white table wines in a 12x8 matrix

What is claimed is:

1. A method for authenticating and classifying a set of materials, the method comprising:
    transmitting a visible range light from a light source toward a vessel containing a material sample;
    wherein the visible range light passes through the vessel containing the material sample, passes through the material sample, and bounces off a holographic optical element (HOE) located at a bottom of the vessel toward a camera implemented in a smartphone;
    receiving, by the camera of the smartphone, the visible range light that bounced off the HOE;
    based on a mapping of each of the visible range light onto an area of an image sensor, generating a holographic optical element that has a plurality of regions, that receives input light reflected or transmitted through a new material, and that filters the input light to a filtered light by each characteristic light spectra, and mapping the filtered light onto the area of the image sensor;
    wherein the holographic optical element is recorded and used to determine whether the new material matches any material in a set of materials.

2. The method of claim 1, further comprising: using the holographic optical element to determine whether the new material matches any material in a set of similar materials that are similar to the set of materials;
    wherein the holographic optical element is generated using a holography approach and a Bragg approach.

3. The method of claim 1, further comprising generating a copy of the holographic optical element by copying the holographic optical element onto the copy of the holographic optical element.

4. The method of claim 3, further comprising authenticating the new material based on the determining, using the copy of the holographic optical element, whether a match is found between the new material and the set of materials or the set of similar materials.

5. The method of claim 1, further comprising
    determining a set of characteristics of visible light spectra reflected or transmitted by a set of materials when the set of materials is illuminated by a plurality of light wavelengths;
    constructing one or more classifiers configured to classify each material of the set of materials based on the set of characteristics of the light spectra;
    using the classifiers to classify, mapping each of the light spectra onto an area of an image sensor.

6. The method of claim 1, wherein the input light transmitted through the new material penetrates the new material that is in a liquid form and that is contained within a space between two sheets of glass;
    wherein the input light reflected from the new material is reflected off dots included in the holographic optical element; each dot configured to filter a specific wavelength of light;

wherein the input light is recorded by a camera through a lens system of the camera and then recorded onto a charge coupled element of the camera.

7. The method of claim 6, wherein the camera is a CMOS charge coupled camera and which has a range from a ultraviolet (UV) spectra into a near infrared (NI) spectra;
wherein the camera has a light source that illuminates a light being within the range, and then reads reflection characteristics of the holographic optical element.

8. One or more non-transitory computer readable storage media storing one or more instructions which, when executed by one or more processors, cause the one or more processors to perform:
transmitting a visible range light from a light source toward a vessel containing a material sample;
wherein the visible range light passes through the vessel containing the material sample, passes through the material sample, and bounces off a holographic optical element (HOE) located at a bottom of the vessel toward a camera implemented in a smartphone;
receiving, by the camera of the smartphone, the visible range light that bounced off the HOE;
based on a mapping of each of the visible range light onto an area of an image sensor, generating a holographic optical element that has a plurality of regions, that receives input light reflected or transmitted through a new material, and that filters the input light to a filtered light by each characteristic light spectra, and mapping the filtered light onto the area of the image sensor;
wherein the holographic optical element is recorded and used to determine whether the new material matches any material in a set of materials.

9. The one or more non-transitory computer readable storage media of claim 8, storing additional instructions for: using the holographic optical element to determine whether the new material matches any material in a set of similar materials that are similar to the set of materials;
wherein the holographic optical element is generated using a holography approach and a Bragg approach.

10. The one or more non-transitory computer readable storage media of claim 8, storing additional instructions for: generating a copy of the holographic optical element by copying the holographic optical element onto the copy of the holographic optical element.

11. The one or more non-transitory computer readable storage media of claim 10, storing additional instructions for: authenticating the new material based on the determining, using the copy of the holographic optical element, whether a match is found between the new material and the set of materials or the set of similar materials.

12. The one or more non-transitory computer readable storage media of claim 8, storing additional instructions for: determining a set of characteristics of visible light spectra reflected or transmitted by a set of materials when the set of materials is illuminated by a plurality of light wavelengths;
constructing one or more classifiers configured to classify each material of the set of materials based on the set of characteristics of the light spectra;
using the classifiers to classify, mapping each of the light spectra onto an area of an image sensor.

13. The one or more non-transitory computer readable storage media of claim 8, wherein the input light transmitted through the new material penetrates the new material that is in a liquid form and that is contained within a space between two sheets of glass;
wherein the input light reflected from the new material is reflected off dots included in the holographic optical element; each dot configured to filter a specific wavelength of light;
wherein the input light is recorded by a camera through a lens system of the camera and then recorded onto a charge coupled element of the camera.

14. The one or more non-transitory computer readable storage media of claim 13, wherein the camera is a CMOS charge coupled camera and which has a range from a ultraviolet (UV) spectra into a near infrared (NI) spectra;
wherein the camera has a light source that illuminates a light being within the range, and then reads reflection characteristics of the holographic optical element.

15. A custom product computer system generator comprising:
a memory unit;
one or more processors; and
a custom product computer storing one or more instructions, which, when executed by one or more processors, cause the one or more processors to perform:
transmitting a visible range light from a light source toward a vessel containing a material sample;
wherein the visible range light passes through the vessel containing the material sample, passes through the material sample, and bounces off a holographic optical element (HOE) located at a bottom of the vessel toward a camera implemented in a smartphone;
receiving, by the camera of the smartphone, the visible range light that bounced off the HOE;
based on a mapping of each of the visible range light onto an area of an image sensor, generating a holographic optical element that has a plurality of regions, that receives input light reflected or transmitted through a new material, and that filters the input light to a filtered light by each characteristic light spectra, and mapping the filtered light onto the area of the image sensor;
wherein the holographic optical element is recorded and used to determine whether the new material matches any material in a set of materials.

16. The custom product computer system generator of claim 15, storing additional instructions for: using the holographic optical element to determine whether the new material matches any material in a set of similar materials that are similar to the set of materials;
wherein the holographic optical element is generated using a holography approach and a Bragg approach.

17. The custom product computer system generator of claim 15, storing additional instructions for: generating a copy of the holographic optical element by copying the holographic optical element onto the copy of the holographic optical element.

18. The custom product computer system generator of claim 17, storing additional instructions for: authenticating the new material based on the determining, using the copy of the holographic optical element, whether a match is found between the new material and the set of materials or the set of similar materials.

19. The custom product computer system generator of claim 15, storing additional instructions for: determining a set of characteristics of visible light spectra reflected or transmitted by a set of materials when the set of materials is illuminated by a plurality of light wavelengths;
constructing one or more classifiers configured to classify each material of the set of materials based on the set of characteristics of the light spectra;

using the classifiers to classify, mapping each of the light spectra onto an area of an image sensor.

20. The custom product computer system generator of claim 15, wherein the input light transmitted through the new material penetrates the new material that is in a liquid form and that is contained within a space between two sheets of glass;
- wherein the input light reflected from the new material is reflected off dots included in the holographic optical element; each dot configured to filter a specific wavelength of light;
- wherein the input light is recorded by a camera through a lens system of the camera and then recorded onto a charge coupled element of the camera,
- wherein the camera is a CMOS charge coupled camera and which has a range from a ultraviolet (UV) spectra into a near infrared (NI) spectra;
- wherein the camera has a light source that illuminates a light being within the range, and then reads reflection characteristics of the holographic optical element.

* * * * *